United States Patent
Gellens et al.

(10) Patent No.: US 9,681,282 B2
(45) Date of Patent: Jun. 13, 2017

(54) TECHNIQUES FOR SUPPORTING TELEMATICS-ENHANCED EMERGENCY CALLS FROM MOBILE PHONES

(71) Applicant: QUALCOMM Incorporated, San Diego, CA (US)

(72) Inventors: Randall Coleman Gellens, San Diego, CA (US); David Hugh Williams, Guildford (GB); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/876,347

(22) Filed: Oct. 6, 2015

(65) Prior Publication Data

US 2016/0105784 A1 Apr. 14, 2016

Related U.S. Application Data

(60) Provisional application No. 62/061,686, filed on Oct. 8, 2014.

(51) Int. Cl.
*H04M 11/04* (2006.01)
*H04W 4/22* (2009.01)
*H04M 3/51* (2006.01)
*H04W 8/20* (2009.01)
(Continued)

(52) U.S. Cl.
CPC ......... *H04W 4/22* (2013.01); *H04M 1/72536* (2013.01); *H04M 3/5116* (2013.01); *H04W 8/205* (2013.01); *H04W 76/007* (2013.01); *H04M 2242/04* (2013.01)

(58) Field of Classification Search
CPC ......... H04M 1/72536; H04M 2242/04; H04M 3/5116; H04W 4/22; H04W 76/007; H04W 8/205
USPC ................. 455/404.1, 404.2, 412.1–414.2, 455/418–422.1, 456.1, 456.2, 457, 456.3, 455/552.1; 370/328, 338; 379/45
See application file for complete search history.

(56) References Cited

U.S. PATENT DOCUMENTS 8,868,028 B1* 10/2014 Kaltsukis ............. H04W 4/028 455/404.1
2011/0117875 A1* 5/2011 Oh ........................ H04M 11/04 455/404.1
(Continued)

OTHER PUBLICATIONS

GSM Europe, "GSME Position: Options for eCall MSD Signalling," 2006 Positions and Publications, Apr. 21, 2006, 22 pgs., GSM Association, www.gsma.com.
(Continued)

*Primary Examiner* — Babar Sarwar
(74) *Attorney, Agent, or Firm* — Holland & Hart LLP

(57) ABSTRACT

Methods, systems, apparatuses, and computer-readable mediums are described for techniques for supporting telematics-enhanced emergency calls from mobile phones. In some aspects, a method for wireless communication may include establishing, by a user equipment (UE), a personal telematics-enhanced emergency call to a public safety answering point (PSAP), wherein the UE is capable of transmitting telematics data. The method may also include transmitting information that distinguishes the personal telematics-enhanced emergency call from other types of emergency calls.

27 Claims, 11 Drawing Sheets

(51) Int. Cl.
*H04M 1/725* (2006.01)
*H04W 76/00* (2009.01)

(56) References Cited

U.S. PATENT DOCUMENTS

2011/0188416 A1* 8/2011 Faccin ................. H04W 76/02
370/310
2015/0245388 A1* 8/2015 Yerrabommanahalli H04W 76/007
455/404.1

OTHER PUBLICATIONS

ISA/EPO, International Search Report and Written Opinion of the International Searching Authority, Int'l. App. No. PCT/US2015/054517, Jan. 13, 2016, European Patent Office, Rijswijk, NL, 10 pgs.

IPEA/EP, Second Written Opinion of the International Preliminary Examining Authority, Int'l App. No. PCT/US2015/054517, Sep. 7, 2016, European Patent Office, Rijswijk, NL, 4 pgs.

* cited by examiner

TECHNIQUES FOR SUPPORTING TELEMATICS-ENHANCED EMERGENCY CALLS FROM MOBILE PHONES

CROSS REFERENCES

The present application for Patent claims priority to U.S. Provisional Patent Application No. 62/061,686 by Gellens et al., entitled "Techniques for Supporting Telematics-Enhanced Emergency Calls from Mobile Phones," filed Oct. 8, 2014, assigned to the assignee hereof, and expressly incorporated by reference herein.

BACKGROUND

Field of the Disclosure

The present disclosure relates to wireless communication systems, and more particularly to techniques for supporting telematics-enhanced emergency calls from mobile phones.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, space and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple wireless devices. Base stations may communicate with wireless devices on downstream and upstream links. Each base station has a coverage range, which may be referred to as the coverage area of the cell.

One application in which wireless communications systems are increasingly being used is establishing emergency calls. Wireless communications systems can provide not only a communication channel for transmitting and receiving voice content, but can also provide additional information, such as the location of the caller, to a public safety answering point (PSAP) that responds to the emergency call. In some instances, the wireless communications system itself may determine the location of the caller and provide the location to the PSAP, but in other instances, the wireless communications system may not be able or willing to provide this information to the PSAP. In those instances where the wireless communications system does not (or cannot) provide the additional information to the PSAP, the device placing the emergency call may provide the additional information, such as the location of the caller, to the PSAP via a communication session signaling protocol. The PSAP may, for example, request a set of data from the device, and the device may respond by sending the requested set of data to the PSAP. Not all devices, however, may be compatible with the communication signaling protocol and thus certain devices may not be able to provide the requested set of data to the PSAP.

One example of a wireless communication system used to support emergency calling is eCall, a European system that integrates wireless connectivity into vehicles to enable the vehicle to establish emergency calls in case of a crash or other event. Vehicles that are eCall capable can send the current location of the vehicle to the responding PSAP in a set of data, commonly known as a minimum set of data (MSD), but may need to do so in-band with the voice connection between the vehicle and the PSAP if, for example, the network coupling the vehicle with the PSAP is a circuit-switched network.

Adapting the eCall in-band signaling protocol to a personal emergency call initiated from a mobile phone may enable transfer of a caller location from the mobile phone to the PSAP, but may also have a side effect of muting of the voice channel for several seconds while the location information is requested by the PSAP and transmitted by the mobile phone. While this muting side effect may be tolerable if it is known to a certain level of confidence that the mobile phone can in fact provide the requested information, the muting may be undesirable in cases where the mobile phone cannot provide the requested information.

SUMMARY

The described features generally relate to one or more improved systems, methods, and apparatuses for techniques for supporting telematics-enhanced emergency calls from mobile phones. A user equipment (UE), such as a mobile phone, that is capable of transmitting telematics data, such as an MSD containing a caller location, to a public safety answering point (PSAP), may establish a personal telematics-enhanced emergency call (which may be referred to herein as a personal eCall). Before, during, or after the emergency call, the UE may also enable and e.g., transmit information that distinguishes the personal telematics-enhanced emergency call from other types of emergency calls to either a serving wireless network for the UE (which may be referred to herein as a mobile operator) or directly to the PSAP. In some aspects of the present disclosure, the information transmitted by the UE may identify the emergency call as being a personal telematics-enhanced emergency call, or may identify the UE as being capable of transmitting telematics data to the PSAP. In other aspects, however, the serving wireless network or the PSAP may determine whether the emergency call is a personal telematics-enhanced emergency call, or whether the UE is a telematics capable UE, based at least in part on information transmitted by the UE or obtained from another source. In some aspects, the serving wireless network or the PSAP may only be able to determine that the emergency call is likely to be a personal telematics-enhanced emergency call or that the UE is likely to be a telematics capable UE (such as when the determination is based on an indication that the subscriber owns at least one device that is telematics capable); the distinction between determining and determining a likelihood are treated equivalently herein. The serving wireless network may take certain actions related to the emergency call based at least in part on whether the emergency call is a personal telematics-enhanced emergency call or not (or whether the device is telematics capable), such as routing the emergency call to a certain PSAP with personal eCall capabilities. Additionally or alternatively, the responding PSAP may take certain actions related to the emergency call based at least in part on whether the emergency call is a personal telematics-enhanced emergency call or not (or whether the device is telematics capable or not), such as requesting telematics data (e.g., including the location of the caller) and mitigating any side effects of requesting and receiving the telematics data.

A method for wireless communication is thus described, with the method including establishing, by a user equipment (UE), a personal telematics-enhanced emergency call to a public safety answering point (PSAP), wherein the UE is capable of transmitting telematics data, and enabling information that distinguishes the personal telematics-enhanced emergency call from other types of emergency calls.

Also an apparatus for wireless communication is described, with the apparatus including means for establishing, by a user equipment (UE), a personal telematics-enhanced emergency call to a public safety answering point (PSAP), wherein the UE is capable of transmitting telematics data, and means for enabling information that distinguishes the personal telematics-enhanced emergency call from other types of emergency calls.

Also, another apparatus for wireless communication is described, with the apparatus including a processor, memory in electronic communication with the processor, and instructions stored in the memory, the instructions being executable by the processor to establish, by a user equipment (UE), a personal telematics-enhanced emergency call to a public safety answering point (PSAP), wherein the UE is capable of transmitting telematics data, and to enable information that distinguishes the personal telematics-enhanced emergency call from other types of emergency calls.

Also, a non-transitory computer-readable medium for wireless communication in a wireless device is described, with the non-transitory computer-readable medium storing computer-executable code for establishing, by a user equipment (UE), a personal telematics-enhanced emergency call to a public safety answering point (PSAP), wherein the UE is capable of transmitting telematics data, and for enabling information that distinguishes the personal telematics-enhanced emergency call from other types of emergency calls.

In some examples of the method, apparatuses, or computer-readable medium, the information that distinguishes the personal telematics-enhanced emergency call from other types of emergency calls may be transmitted to the PSAP. The information that distinguishes the personal telematics-enhanced emergency call from other types of emergency calls may include an indicator in a service category information element, and the indicator may include a binary flag indicating a personal eCall. The information that distinguishes the personal telematics-enhanced emergency call from other types of emergency calls may include a number of indicators in a service category information element, and the number of indicators may include a multi-bit field indicating a personal eCall, an automatic vehicle eCall, a manual vehicle eCall, any combination of the foregoing, or none of the foregoing. The information that distinguishes the personal telematics-enhanced emergency call from other types of emergency calls may be via in-band signaling, and the in-band signaling may include one or more dual-tone multi-frequency (DTMF) tones transmitted at the beginning of the personal telematics-enhanced emergency call. The information that distinguishes the personal telematics-enhanced emergency call from other types of emergency calls may be based at least in part on control plane signaling.

In some examples, the information that distinguishes the personal telematics-enhanced emergency call from other types of emergency calls may include an identifier for the UE. The identifier for the UE may be present in a database accessible to the PSAP or a serving wireless network for the UE, and may include at least one of a mobile station international subscriber directory number (MSISDN), an international mobile subscriber identity (IMSI), or an international mobile equipment identity (IMEI). Alternatively or additionally, a device model number or ID (not unique to an individual device) may identify the UE as having certain capabilities (e.g., telematics). The information that distinguishes the personal telematics-enhanced emergency call from other types of emergency calls may include a wireless network subscription option.

In some examples, the information that distinguishes the personal telematics-enhanced emergency call from other types of emergency calls may be transmitted to a serving wireless network for the UE. The information that distinguishes the personal telematics-enhanced emergency call from other types of emergency calls may include an information element transmitted by the UE during authentication with the serving wireless network. The information that distinguishes the personal telematics-enhanced emergency call from other types of emergency calls may include an information element transmitted by the UE during a device management messaging session with the serving wireless network.

In some examples, a request to transmit a set of data to the PSAP may be received, from the PSAP, based at least in part on the information that distinguishes the personal telematics-enhanced emergency call from other types of emergency calls, and the set of data may be transmitted to the PSAP. The information that distinguishes the personal telematics-enhanced emergency call from other types of emergency calls may be transmitted over a circuit-switched network coupling the UE to the PSAP. The other types of emergency calls may include automatic vehicle eCalls, manual vehicle eCalls, and non-telematics-enhanced emergency calls.

Another method for wireless communication is also described, with the method including receiving an emergency call, receiving information associated with the emergency call, and determining, based at least in part on the received information, whether the emergency call is a personal telematics-enhanced emergency call originating from a user equipment (UE) that is capable of transmitting telematics data to a public safety answering point (PSAP).

Another apparatus for wireless communication is also described, with the apparatus including means for receiving an emergency call, means for receiving information associated with the emergency call, and means for determining, based at least in part on the received information, whether the emergency call is a personal telematics-enhanced emergency call originating from a user equipment (UE) that is capable of transmitting telematics data to a public safety answering point (PSAP).

Another apparatus for wireless communication is also described, with the apparatus including a processor, memory in electronic communication with the processor, and instructions stored in the memory, the instructions being executable by the processor to receive an emergency call, receive information associated with the emergency call, and determine, based at least in part on the received information, whether the emergency call is a personal telematics-enhanced emergency call originating from a user equipment (UE) that is capable of transmitting telematics data to a public safety answering point (PSAP).

Another non-transitory computer-readable medium for wireless communication in a wireless device is also described, the non-transitory computer-readable medium storing computer-executable code for receiving an emergency call, receiving information associated with the emergency call, and determining, based at least in part on the received information, whether the emergency call is a personal telematics-enhanced emergency call originating from a user equipment (UE) that is capable of transmitting telematics data to a public safety answering point (PSAP).

In some examples of the method, apparatuses, or computer-readable medium thus described, the emergency call and information associated with the emergency call may be received at the PSAP. The information associated with the emergency call may be received from a serving wireless network of the UE. The information associated with the emergency call may be received from the UE. The information associated with the emergency call may include an indicator in a service category information element, and the indicator may include a binary flag indicating a personal eCall. The information associated with the emergency call may include a number of indicators in a service category information element, and the number of indicators may include a multi-bit field indicating a personal eCall, an automatic vehicle eCall, a manual vehicle eCall, any combination of the foregoing, or none of the foregoing. Reception of the information associated with the emergency call may be via in-band signaling, and the in-band signaling may include one or more dual-tone multi-frequency (DTMF) tones transmitted at the beginning of the emergency call. Reception of the information associated with the emergency call may be based on control plane signaling. The information associated with the emergency call may include a device identifier of the UE. The information associated with the emergency call may include a unique identity of the UE, and the unique identity may include at least one of a Mobile Station International Subscriber Directory Number (MSISDN), an International Mobile Subscriber Identity (IMSI), or an International Mobile Equipment Identity (IMEI). The unique identity of the UE may be checked against a database of unique identities indicating whether the UE corresponding to the unique identity is capable of transmitting telematics data to the PSAP. The database may be supported by the serving wireless network or a home wireless network for the UE. The information also may include an identity, such as a model number, that is not unique to an individual device but serves to indicate capabilities of the device.

In some examples, the information associated with the emergency call may be received from a serving wireless network for the UE, and the information associated with the emergency call may include an indication of whether the emergency call is a personal telematics-enhanced emergency call from a UE capable of transmitting telematics data to the PSAP. The indication may be associated with a subscription option for the UE indicating that the UE is capable of transmitting telematics data to the PSAP. A request may be transmitted to the UE to send a set of data to the PSAP, and the set of data transmitted by the UE may be received at the PSAP. The set of data may include a location estimate for the UE determined by the UE. A request for the UE to send a set of data to the PSAP may be transmitted if the information received does not identify the emergency call as a personal telematics-enhanced emergency call from a UE capable of transmitting telematics data to the PSAP, and the PSAP may monitor for reception of the set of data from the UE.

In some examples, the emergency call and information associated with the emergency call may be received at a serving wireless network for the UE. The information associated with the emergency call may include an information element transmitted by the UE during authentication with the serving wireless network, and an indication of whether the emergency call is a personal telematics-enhanced emergency call from a UE capable of transmitting telematics data to the PSAP may be transmitted to the PSAP. The information associated with the emergency call may include an information element transmitted by the UE during a device management messaging session with the serving or home wireless network, and an indication of whether the emergency call is a personal telematics-enhanced emergency call from a UE capable of transmitting telematics data to the PSAP may be transmitted to the PSAP. The information associated with the emergency call may include a subscriber identifier, and an indication of whether the emergency call is a personal telematics-enhanced emergency call from a UE capable of transmitting telematics data to the PSAP may be transmitted to the PSAP. The emergency call may be routed based at least in part on the information associated with the emergency call.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
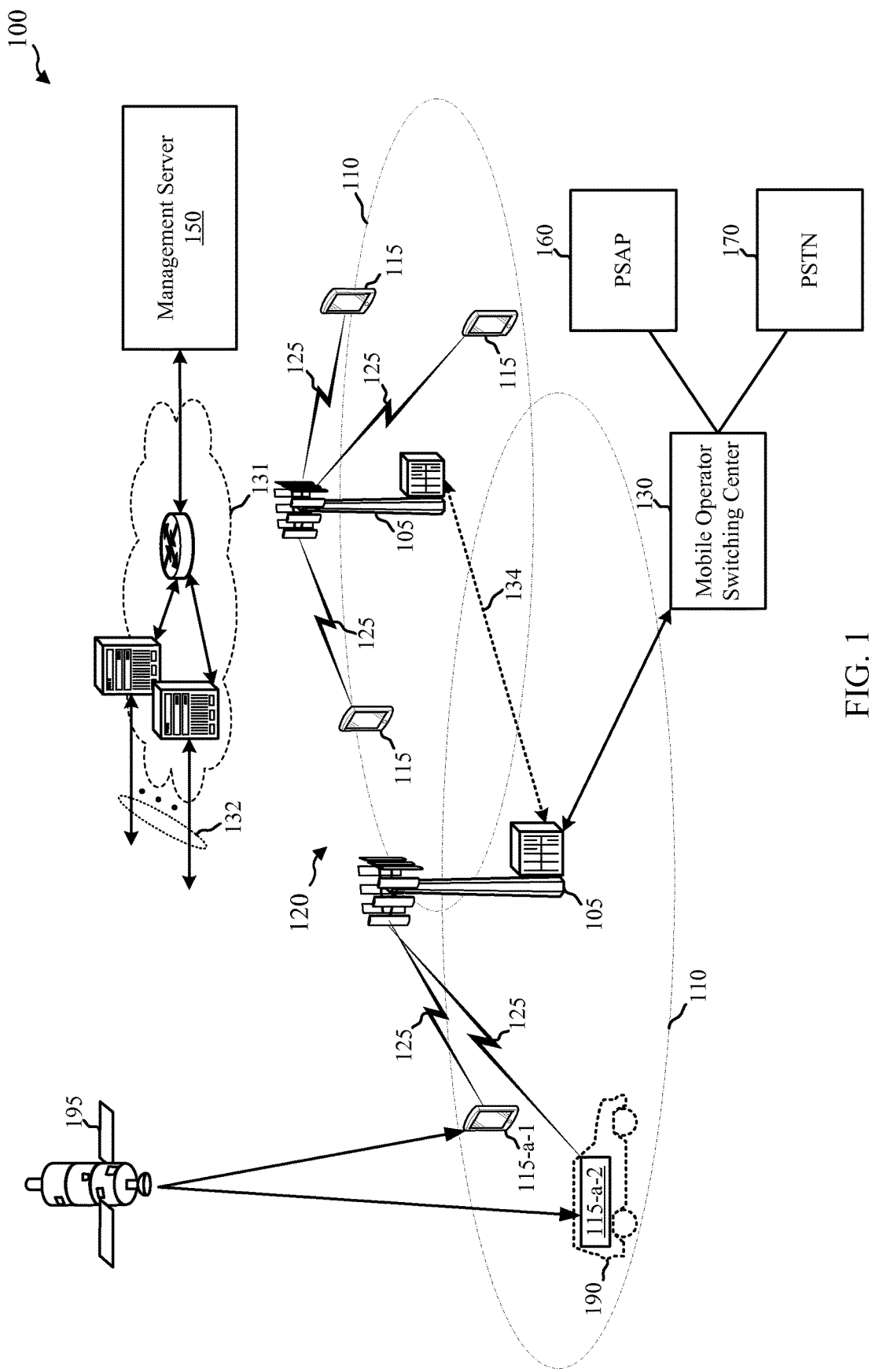
FIG. 1 shows a diagram of a wireless communications system, in accordance with various aspects of the present disclosure.

Features generally relating to techniques for supporting telematics-enhanced emergency calls from mobile phones are described. As further described below, a user equipment (UE), such as a mobile phone, may establish a personal telematics-enhanced emergency call. A personal telematics-enhanced emergency call may be referred to as a personal eCall, and may be an emergency call similar to a vehicle eCall, except that it is initiated by a mobile phone. A personal eCall may be similar to a vehicle eCall in that, in addition to the conventional voice communication between the caller and the responding PSAP, a personal eCall may allow additional information (e.g., telematics data, location of the caller, etc.) to be transmitted from the mobile phone to the responding PSAP, including the location of the caller.

Given the variety of different devices that can establish multiple different types of emergency calls, however, a mechanism is described herein whereby personal eCalls can be distinguished from other types of emergency calls. For example, the emergency call can be identified as a personal eCall as opposed to an automatically initiated vehicle eCall (e.g., an emergency call initiated by a vehicle in response to an accident), a manually initiated vehicle eCall (e.g., an emergency call initiated by a driver of a vehicle through the vehicle's eCall system), or a traditional emergency call that is not telematics-enhanced. Whereas a vehicle eCall may be triggered by and include information from sensors such as air bag and/or crash sensors, a personal eCall may lack such information. As another example, an emergency call can be identified as coming from a device that is capable of transmitting telematics data to the PSAP. A number of different embodiments are described herein, including embodiments in which the mobile phone indicates whether or not a particular emergency call is a personal eCall, embodiments in which the mobile phone indicates that it supports telematics data transfer, embodiments in which a serving wireless network determines whether or not a particular emergency call is a personal eCall and may then transmit an indication of the same to the PSAP, embodiments in which the serving wireless network determines whether or not a particular device supports telematics data transfer, embodiments in which the PSAP determines whether or not a particular emergency call is a personal eCall, embodiments in which the PSAP determines whether or not a particular device supports telematics data transfer, and combinations of the foregoing.

The indication of whether or not a particular emergency call is a personal eCall or the indication of whether a particular device supports telematics data transfer may be used by the serving wireless network to, for example, route the emergency call to an appropriate PSAP (e.g., a PSAP that supports personal eCalls). Additionally or alternatively, the indication may be used by the responding PSAP to, for example, request a set of data (e.g., an MSD) and to mitigate any side effects of requesting and receiving the set of data (such as warning the caller of the unavailability of the voice channel during transmission of the request and the resulting transmission of data). The set of data may include an estimated location of the caller, and may be a standardized set of data, such as the MSD defined for the European eCall system.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, wireless devices 115, and a core network 131. The core network 131 may provide user authentication, access authorization, tracking, Internet Protocol (IP) connectivity, and other access, routing, or mobility functions. The base stations 105 interface with the core network 131 through backhaul links 132 (e.g., S1, etc.) and may perform radio configuration and scheduling for communication with the wireless devices 115, or may operate under the control of a base station controller (not shown). In various examples, the base stations 105 may communicate, either directly or indirectly (e.g., through core network 131), with each other over backhaul links 134 (e.g., X1, etc.), which may be wired or wireless communication links.

The base stations 105 may wirelessly communicate with the wireless devices 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies.

In some examples, the wireless communications system 100 is a Long Term Evolution (LTE) or LTE-Advanced (LTE-A) network. In LTE/LTE-A networks, the term evolved Node B (eNB) may be generally used to describe the base stations 105, while the term user equipment (UE) may be generally used to describe the wireless devices 115. The wireless communications system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a term used by an organization named "3rd Generation Partnership Project" (3GPP) to describe a base station, a carrier or component carrier associated with a base station, or a coverage area (e.g., sector, etc.) of a carrier or base station, depending on context. In other examples, the wireless communication system 100 may be a Global System for Mobile Communications (GSM) network, a Wideband Code Division Multiple Access (WCDMA) network, a General Packet Radio Service (GPRS) access network, a Long Term Evolution (LTE) network, a CDMA 1X network, a High Rate Packet Data (HRPD) network, an Ultra Mobile Broadband (UMB) network, or generally any type of wireless communications network.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The wireless devices 115 are dispersed throughout the wireless communications system 100, and each wireless device 115 may be stationary or mobile. A wireless device 115 may also include or be referred to by those skilled in the art as a mobile station, a subscriber station, a mobile unit, a subscriber unit, a wireless unit, a remote unit, a mobile device, a wireless communications device, a remote device, a mobile subscriber station, an access terminal, a mobile terminal, a wireless terminal, a remote terminal, a handset, a user agent, a user equipment (UE), a mobile client, a client, or some other suitable terminology. A wireless device 115 may be a cellular phone, a personal digital assistant (PDA), a wireless modem, a wireless communication device, a handheld device, a tablet computer, a laptop computer, a cordless phone, a wireless local loop (WLL) station, or the like. A wireless device may be able to communicate with various types of base stations and network equipment including macro eNBs, small cell eNBs, relay base stations, and the like.

The communication links 125 shown in wireless communications system 100 may include uplink (UL) transmissions from a wireless device 115 to a base station 105, or downlink (DL) transmissions, from a base station 105 to a wireless device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) operation (e.g., using paired spectrum resources) or time division duplex (TDD) operation (e.g., using unpaired spectrum resources). Frame structures for FDD (e.g., frame structure type 1) and TDD (e.g., frame structure type 2) may be defined.

In some embodiments of the wireless communications system 100, base stations 105 or wireless devices 115 may include multiple antennas for employing antenna diversity schemes to improve communication quality and reliability between base stations 105 and wireless devices 115. Additionally or alternatively, base stations 105 or wireless devices 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A wireless device 115 may be configured with multiple downlink CCs and one or more uplink CCs for carrier aggregation. Carrier aggregation may be used with both FDD and TDD component carriers.

The wireless communications system 100 may include a management server 150 that may be connected to the base stations 105 (e.g., connected to a radio network associated with the base stations 105) through the core network 131. The management server 150 may receive information from the base stations 105 to perform various types of operations (e.g., calculations) described herein.

As illustrated in FIG. 1, a number of different wireless devices 115-*a*-1, 115-*a*-2 may initiate wireless emergency calls over communication links 125 with a nearby base station 105. One of the wireless devices may be a mobile phone 115-*a*-1 or other type of UE that is configured to transmit telematics data to a public safety answering point (PSAP) 160 (or to a public switched telephone network (PTSN) 170) via a communication session signaling protocol before, during, or after an emergency call initiated by a caller of the mobile phone 115-*a*-1. Another of the wireless devices may be a transmitter 115-*a*-2 in a vehicle 190 that is also configured to transmit telematics data to the PSAP 160 via a communication session signaling protocol before, during, or after an emergency call initiated by the vehicle 190. Thus the mobile phone 115-*a*-1 may be personal eCall capable, and the vehicle 190 may be vehicle eCall capable. In some embodiments, circuit-switched telephony may be used to exchange the telematics data via a voice channel established between the mobile phone 115-*a*-1 or vehicle 190 and the PSAP 160. Such exchange may be facilitated by a mobile operation switching center 130.

Telematics data may refer broadly to data generated, collected, or stored at a device (such as a mobile phone 115-*a*-1 or vehicle 190) for transmission to the PSAP 160 for processing. Telematics data may include, but is not limited to, diagnostics data, location data, data identifying and/or describing a source device or the user of the source device (e.g. data identifying a vehicle, make of vehicle, a user or certain conditions of a user such as known medical problems), sensor data, and the like. In some embodiments, the recipient of telematics data may be another device (e.g. a PC, laptop, mobile phone, other central service) that may be distinct from a PSAP or may belong to a PSAP and the recipient may then store the telematics data, process it in some way or forward the data at the time of receipt or at a later time to another entity such as PSAP 160. In at least some embodiments, telematics data may be used herein to refer to an estimated location of a UE without any other defined data fields, whereas in other embodiments, telematics data may refer to a broader set of different types of data.

The mobile operator switching center 130 in FIG. 1 may include a visitor location register (VLR), a mobile switching center (MSC) as defined by 3GPP or other network entities not shown in FIG. 1 for simplicity, and may be associated with a serving wireless network for a particular UE. The mobile operator switching center 130 may be configured to receive emergency and other calls from wireless devices 115 and route calls to either the PSAP 160 or a public switched telephone network (PSTN) 170. The mobile operator switching center 130 may also be configured to route packet-based requests and transmissions to and from the wireless device 115.

The PSAP 160 may also be referred to as a central service, or an Emergency Center (EC), and may be operated or owned by or on behalf of a government (e.g., city, state, or federal) agency. The PSTN 170 may provide telephone services for conventional wireline telephones.

The wireless devices 115, including the mobile phone 115-*a*-1 and the transmitter 115-*a*-2 in the vehicle 190 may have a service subscription with a home wireless network, which may be the same as the serving wireless network or different. The subscription data may be stored, for example, at the mobile operator switching center 130, the management server 150, etc. in the case that the home wireless network is the same as the serving wireless network. The subscription data may be transferred to the mobile operator switching center 130 or the management server 150, etc. by the home wireless network when not the same as the serving wireless network.

The wireless devices 115, including the mobile phone 115-*a*-1 and the transmitter 115-*a*-2 in the vehicle 190 may also receive signals from one or more satellites 195 or other positioning devices, which may be part of a satellite positioning system (SPS) or other positioning system. This may enable the wireless device 115 to compute and maintain an accurate estimate of its current location or to obtain an accurate location estimate when or soon after the wireless device 115 makes an emergency call or a personal eCall. An SPS may include a system of transmitters positioned to enable entities to determine their location on or above the Earth based, at least in part, on signals received from the transmitters.

In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., or various augmentation systems (e.g., an Satellite Based Augmentation System (SBAS)) that may be associated with or otherwise enabled for use with one or more global or regional navigation satellite systems.

By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), or the like. Thus, as used herein an SPS may include any combination of one or more global or regional navigation satellite systems or augmentation systems, and SPS signals may include SPS, SPS-like, or other signals associated with such one or more SPS. The wireless devices 115, including the mobile phone 115-*a*-1 and the transmitter 115-*a*-2 in the vehicle 190, may measure signals from satellites 195 and obtain pseudo-range measurements. The wireless devices 115, including the mobile phone 115-*a*-1 and the transmitter 115-*a*-2 in the vehicle 190 may also measure signals from base stations 105 in the network 100 in order to obtain timing or signal strength measurements for the base stations 105. The pseudo-range measurements, timing measurements, or signal strength measurements may be used to derive an estimated location for the wireless devices 115, including the mobile phone 115-*a*-1 and the transmitter 115-*a*-2 in the vehicle 190. A location may also be referred to as a position estimate, a position fix, etc. As described in more detail below, the location derived by the wireless devices 115, including the mobile phone 115-*a*-1 and the transmitter 115-*a*-2 in the vehicle 190 may be transmitted as telematics data to the PSAP 160 during a personal telematics-enhanced emergency call, such as a personal eCall.

Each of the wireless devices 115, including the mobile phone 115-*a*-1 and the transmitter 115-*a*-2 in the vehicle 190 may include a device identifier, such as an International Mobile Equipment Identity (IMEI), which is a unique number assigned to the device. The wireless devices 115, including the mobile phone 115-*a*-1 and the transmitter 115-*a*-2 in the vehicle 190 may each be used for a service subscription of a user. The service subscription may be associated with a subscriber identifier, such as an International Mobile Subscriber Identity (IMSI), which is a unique number assigned to a subscription for cellular networks such as GSM, WCDMA, LTE, and cdma2000 1× networks. The service subscription may also be associated with a Mobile Subscriber Integrated Services Digital Network Number (MSISDN), which is a telephone number for the service subscription. The IMSI or MSISDN may be used as a key for the service subscription in a subscriber database (e.g., a subscriber database in the home wireless network for a subscriber). The MSISDN may be dialed by other users to connect calls to, for example, the mobile phone 115-*a*-1 used for the service subscription. The IMSI, the MSISDN, or other subscription information may be stored in a Subscriber Identity Module (SIM) or a Universal Subscriber Identity Module (USIM), which may be inserted into each device 115. The devices 115 may alternatively have no SIM/USIM, in which case device 115 may have only an IMEI but no IMSI or MSISDN. Further, rather than using a unique identifier for the device, a model number or the like may indicate capabilities of a particular model of devices.

The devices 115, including the mobile phone 115-*a*-1 and the transmitter 115-*a*-2 in the vehicle 190 may support one or more different types of emergency calls, which may or may not be associated with well-known emergency numbers such as 911 in North America and 112 in Europe. One type of emergency call may be known as an eCall, which may be an emergency call in which telematics data can be transmitted to the PSAP 160 in addition to supporting voice or other media communication between the caller and the PSAP 160. Support for eCalls may be required by the European Union and by other world regions or countries. The telematics data in an eCall may be transferred within a voice channel or via a communication session signaling protocol, and may include one or more parameters, such as a location of the caller, how the eCall was initiated (e.g. whether manually by a user or automatically in response to sensor data or a sensor trigger), an identification number (VIN, IMEI, IMSI, etc.), a timestamp, and possibly other information.

Before, during, or after establishment of an emergency call with the PSAP 160, at least some of the devices 115, such as the mobile phone 115-a-1, may be configured to enable (e.g., transmit) information that distinguishes a personal telematics-enhanced emergency call from other types of emergency calls, such as non-telematics-enhanced emergency calls, vehicular emergency calls initiated by the transmitter 115-a-2 in the vehicle 190, and so forth. The information may be a specific indication of a personal eCall, for example, indicating the capability of the personal eCall (e.g., telematics-enhanced or not), or may be information that is transmitted for some other purpose or function (e.g., registration or authentication), or may be information provided in response to a request or instruction (e.g., how the UE subscribes, attaches or initiates a call, such as alternate or additional forms of a registration ID, or a token provided when registering, attaching or initiating a call), or may be information provided a priori to a service provider or PSAP (e.g., prior to establishing the emergency call), information included in data or media sent to the PSAP (e.g., a flag or token identifying a next-generation call, or a DTMF or audio indication in a circuit-switched call). The enablement of such information may thus be behavioral as well as transactional, explicit or implicit, and may occur as part of emergency call establishment or prior thereto. Further, such information may be enabled by the service provider (e.g., carrier), for example, with the service provider determining that the UE supports telematics enhancements based at least in part on how the UE subscribed, attached or initiated the call, or by accessing a database including information for the UE (e.g., an ID associated with the UE, such as an IMEI, a model number, an IMSI, etc.). The service provider may enable the information by informing the PSAP that the UE has such capability. The information may be enabled by the PSAP as well, for example, by querying the UE, accessing a database, etc. Thus, the information may include, for example, a type of emergency call, a type of UE, capabilities of the UE, a subscriber ID, or generally any information that may be used as described herein.

Figure 2:
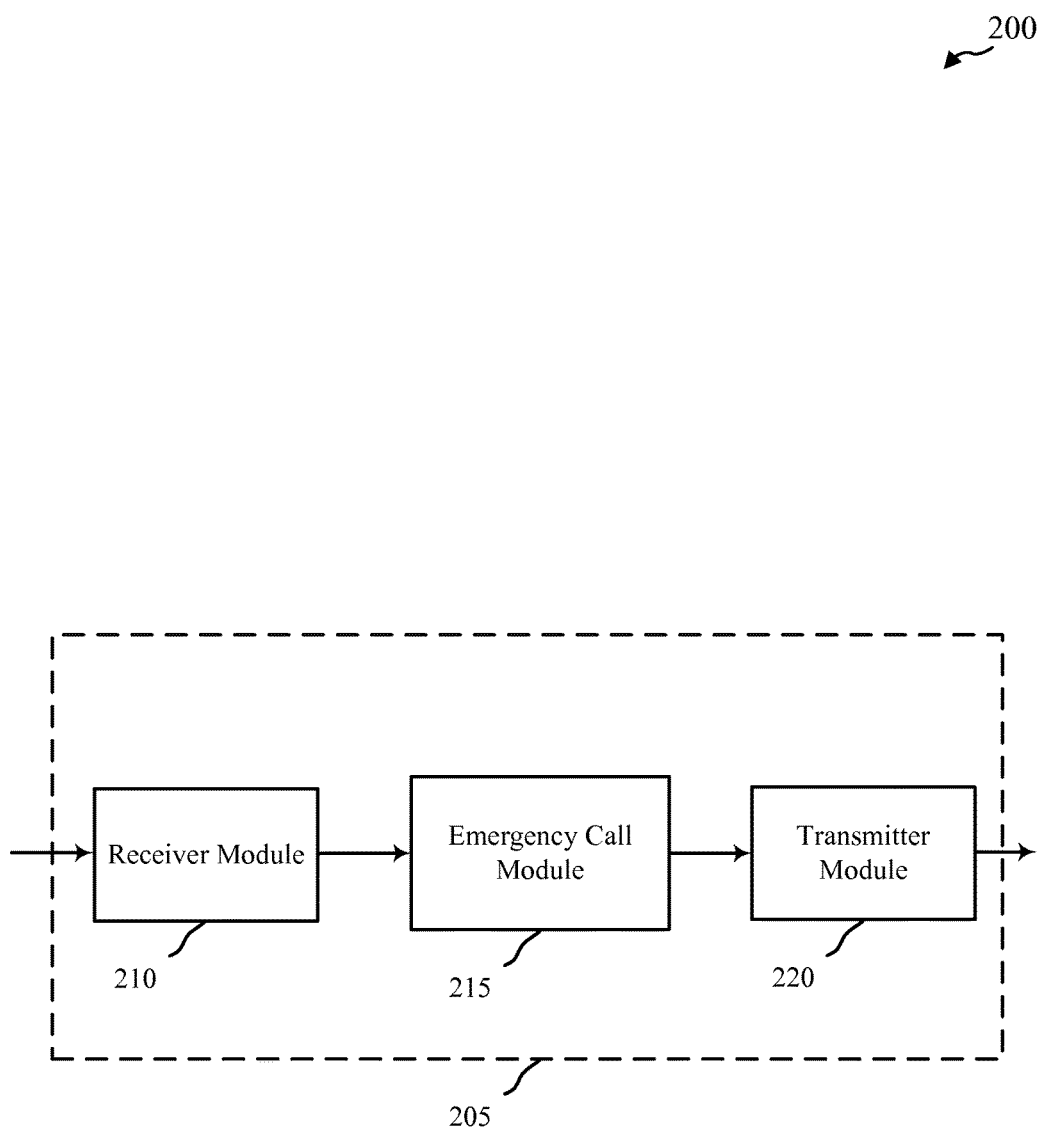
FIG. 2 shows a block diagram of a device configured for use in wireless communication, in accordance with various aspects of the present disclosure.

FIG. 2 shows a block diagram 200 of a device 205 for use in wireless communication, in accordance with various aspects of the present disclosure. The device 205 may be an example of one or more aspects of an the devices 115, including the mobile phone 115-a-1, the PSAP 160, or the serving wireless network, including the mobile operator switching center 130. The device 205 may include a receiver module 210, an emergency call module 215, and a transmitter module 220. The device 205 may also be or include a processor (not shown). Each of these modules may be in communication with each other.

The device 205, through the receiver module 210, the emergency call module 215, or the transmitter module 220, may be configured to perform functions described herein. For example, the device 205 may be configured to establish or receive one or more of several different types of emergency call.

The components of the device 205 (as well as the modules described below with reference to FIGS. 3, 4, 5, and 6) may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The receiver module 210 may receive information such as packets, user data, or control information associated with various information channels (e.g., control channels, data channels, etc.). Information may be passed on to the emergency call module 215, and to other components of the device 205.

The emergency call module 215 may be configured to conduct one or more portions of an emergency call, depending on what type of device the device 205 is. For example, if the device 205 is a mobile phone 115-a-1, the emergency call module 215 may be configured to establish, by the mobile phone 115-a-1, a personal telematics-enhanced emergency call to the PSAP 160 in FIG. 1 if the device 205 is capable of transmitting telematics data to the PSAP 160. In this example, the emergency call module 215 may further be configured to enable (e.g., transmit, identify, or otherwise provide or obtain) information that distinguishes the personal telematics-enhanced emergency call from other types of emergency calls, as described in more detail below. The other types of emergency calls may include automatic vehicle eCalls, manual vehicle eCalls, non-telematics-enhanced emergency calls, and so forth. The information may be, for example, an explicit indication of a certain type of emergency call, an explicit indication of support for telematics data transfer, or some other information that may be used by another entity to distinguish personal telematics-enhanced emergency calls from other types of emergency calls.

As another example, if the device 205 is a mobile operator switching center 130 or a PSAP 160, the emergency call module 215 may be configured to receive an emergency call, to receive information associated with the emergency call, and to determine, based at least in part on the received information, whether the emergency call is a personal telematics-enhanced emergency call originating from a mobile phone 115-a-1 that is capable of transmitting telematics data to the PSAP 160 in FIG. 1.

The transmitter module 220 may transmit the one or more signals received from other components of the device 205. In some examples, the transmitter module 220 may be collocated with the receiver module 210 in a transceiver module.

Figure 3:
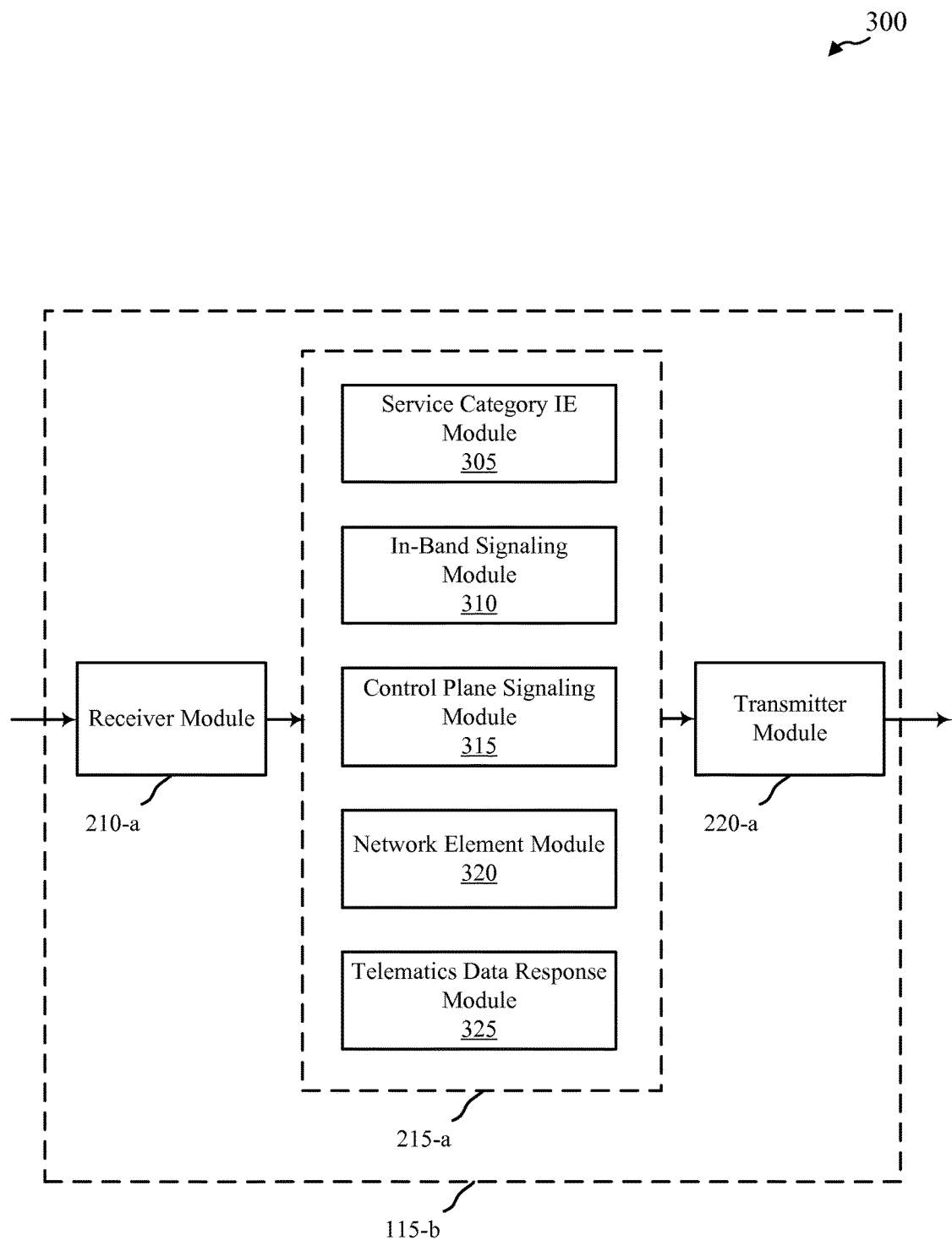
FIG. 3 shows a block diagram of a device configured for use in wireless communication, in accordance with various aspects of the present disclosure.

FIG. 3 shows a block diagram 300 of a mobile phone 115-b that is used for wireless communication, in accordance with various examples. The mobile phone 115-b may be an example of one or more aspects of the devices 115 and mobile phone 115-a-1 described above. It may also be an example of the device 205 described with reference to FIG. 2. The mobile phone 115-b may include a receiver module 210-*a*, an emergency call module 215-*a*, and a transmitter module 220-*a*, which may be examples of the corresponding modules of device 205. The mobile phone 115-*b* may also include a processor (not shown). Each of these modules may be in communication with each other.

As described above, the emergency call module 215-*a* of the mobile phone 115-*b* may be configured to establish a personal telematics-enhanced emergency call if the mobile phone 115-*b* is capable of transmitting telematics data to the PSAP 160 in FIG. 1, and also may be configured to enable (e.g., transmit) information that distinguishes the personal telematics-enhanced emergency call from other types of emergency calls.

In some examples, the emergency call module 215-*a* may be configured to transmit an explicit indication that a particular emergency call is a personal telematics-enhanced emergency call (such as a personal eCall). The explicit indication may be, for example, existing eCall flags or a new eCall flag described below with reference to the service category IE module 305, or may be in-band or control plane signaling as described below with reference to the in-band signaling module 310 and the control plane signaling module 315.

In other examples, however, the emergency call module 215-*a* may be configured to transmit information that either directly indicates that the mobile phone 115-*b* supports telematics-enhanced emergency calls (such as personal eCalls), or that indirectly indicates such support. In these examples, the information may be transmitted, regardless of whether the particular emergency call at issue is or is not a telematics-enhanced emergency call so that the emergency call module 215-*a* indicates in all emergency calls established by the mobile phone 115-*b* its support for telematics data transfer via the communication session signaling protocol. Such information may be a device or subscriber identifier as described below with reference to the subscriber ID module 415 or the device ID module 510 (which the serving wireless network or PSAP 160 can look up in a database to determine whether the mobile phone 115-*b* supports telematics-enhanced emergency calls such as personal eCalls), or may be an information element transmitted to the mobile operator switching center 130 or the PSAP 160 and by which a network element may determine whether the mobile phone 115-*b* supports telematics-enhanced emergency calls such as personal eCalls.

As illustrated in FIG. 3, the emergency call module 215-*a* of the mobile phone 115-*b* may include a service category information element (IE) module 305, an in-band signaling module 310, a control plane signaling module 315, a network element module 320, and a telematics data response module 325.

The service category information element (IE) module 305 may be configured to provide a service category IE as part of establishing the emergency call. The service category IE may include an emergency service category value, which may be one octet or more than one octet. As described herein, the service category IE may include one or more indicators (e.g., flags) that may explicitly indicate a type of emergency call or support for certain telematics data transfer capabilities via assignment of certain bit fields. In one example, previously defined indicators identifying automatic and manual vehicle eCalls may be redefined as a multi-bit field indicating a personal eCall, an automatic vehicle eCall, a manual vehicle eCall, a combination of the foregoing, or none of the foregoing. In another example, a newly defined indicator may identify a call as being a personal eCall separate from the already existing indicators for vehicle eCalls. The newly defined indicator may be an extension bit, which points to a new octet indicating the type of emergency call.

The in-band signaling module 310 may be configured to provide in-band signaling indicating the type of emergency call or indicating support for certain telematics data transfer capabilities. One example of in-band signaling may be one or more dual-tone multi-frequency (DTMF) tones transmitted at the beginning of the emergency call. Such DTMF tones or other in-band tone may thus indicate to the PSAP 160 that the emergency call is a personal eCall or that the mobile phone 115-*b* is personal eCall capable. In some embodiments, the PSAP 160 may include hardware that automatically detects such a tone or other in-band signaling and provide an indication to the call taker, whereas in other embodiments the call taker at the PSAP 160 may recognize the tone by ear.

As another example of in-band signaling, the in-band signaling module 310 may be configured to generate and transmit an audible sound that is designed to have minimal interference with speech, similar to the periodic soft beep that is often used to indicate that a call is being recorded, but distinguished from such beep (e.g., a brief tone that rises or falls in pitch or otherwise changes). Such a discreet audible sound may be transmitted at the beginning of the call only (e.g., if the PSAP 160 includes equipment to automatically detect and then store an indication of the capabilities of the mobile phone 115-*b*), or periodically during the call (among other possible reasons, to allow for situations where the call taker was not on the call at the start or to remind the call taker of the personal eCall capabilities of the mobile phone 115-*b*).

The control plane signaling module 315 may be configured to provide control plane signaling indicating the type of emergency call or indicating support for certain telematics data transfer capabilities. Such control plane signaling may be a standardized protocol, such as the ITU-T ISDN User Part (ISUP) protocol, for indicating the type of emergency call or telematics support.

The network element module 320 may be configured to provide device type information during authentication with the serving or home wireless network or during a device management messaging session with the serving or home wireless network. In one example, the device management or other signal may go to the home network, and the home network may inform the visiting network (e.g., during authentication). The information provided by the network element module 320 may distinguish a particular emergency call from other types of emergency calls, may identify certain telematics capabilities of the mobile phone 115-*b*, or both. The device type information may include, for example, manufacturer and model information, which can be compared against a database or list of devices that support telematics data transfer as part of an emergency call (i.e., support personal eCall). In this manner, the network 100 may apply routing and processing rules for personal eCalls to any emergency call placed by the mobile phone 115-*b* for that subscriber.

The telematics data response module 325 may be configured to receive, from the PSAP 160, a request to transmit a set of data to the PSAP 160 based at least in part on the (transmitted) information that distinguishes the personal telematics-enhanced emergency call from other types of emergency calls or that asserts certain telematics capabilities of the mobile phone 115-*b*. The set of data may be a defined minimum set of data (MSD), or another set of data requested by the PSAP 160. The telematics data response module 325 may also be configured to respond to such a request by providing the requested set of data to the transmitter module 220-*a* for transmission to the PSAP 160.

The receiver module 210-*a* and the transmitter module 220-*a* may perform the functions of the receiver module 210 and the transmitter module 220, of FIG. 2, respectively. For example, the receiver module 210-*a* may receive a request from a user of the mobile phone 115-*b* to place an emergency call, may receive an estimated location of the mobile phone 115-*b* from other components, may receive voice data from the user/caller to transmit to the PSAP 160, may receive a request to transmit telematics data such as the estimated location to the PSAP 160, and so forth.

The transmitter module 220-*a* may establish the emergency call with the PSAP 160 via the mobile operator switching center 130, may transmit the indication of the type of emergency call or an indication of support for certain telematics capabilities, may transmit the estimated location and other telematics data to the PSAP 160 in response to receiving a request to transmit the data, may transmit voice data from the user/caller to the PSAP 160, and so forth. In some embodiments, the transmitter module 220-*a* may be configured to transmit information distinguishing a personal telematics-enhanced emergency call from other types of emergency calls (or, alternatively, information distinguishing capabilities of the mobile device 115-*b* from other types of wireless devices) to a serving wireless network, to the PSAP 160, or to both. For example, the transmitter module 220-*a* may transmit the service category IE from the service category IE module 305, and the in-band signaling from the in-band signaling module 310, all directly to the PSAP 160, as well as signaling based on or derived from control plane signaling from the control plane signaling module 315. On the other hand, the transmitter module 220-*a* may be configured to transmit the information elements from the network element module 320 to the serving wireless network (which may also be referred to as the mobile operator) of the network 100, who in turn may transmit an indicator of the type of emergency call or an indicator of the telematics capabilities of the mobile phone 115-*b* to the PSAP 160. In this case, transmission of the information elements may be directly to the serving wireless network via control plane signaling, with the indicator transmitted to the PSAP being based on or derived from the control plane signaling.

The receiver module 210-*a* and the transmitter module 220-*a* may be configured to receive and transmit data over a circuit-switched network coupling the mobile phone 115-*b* to the PSAP 160 in some embodiments.

Figure 4:
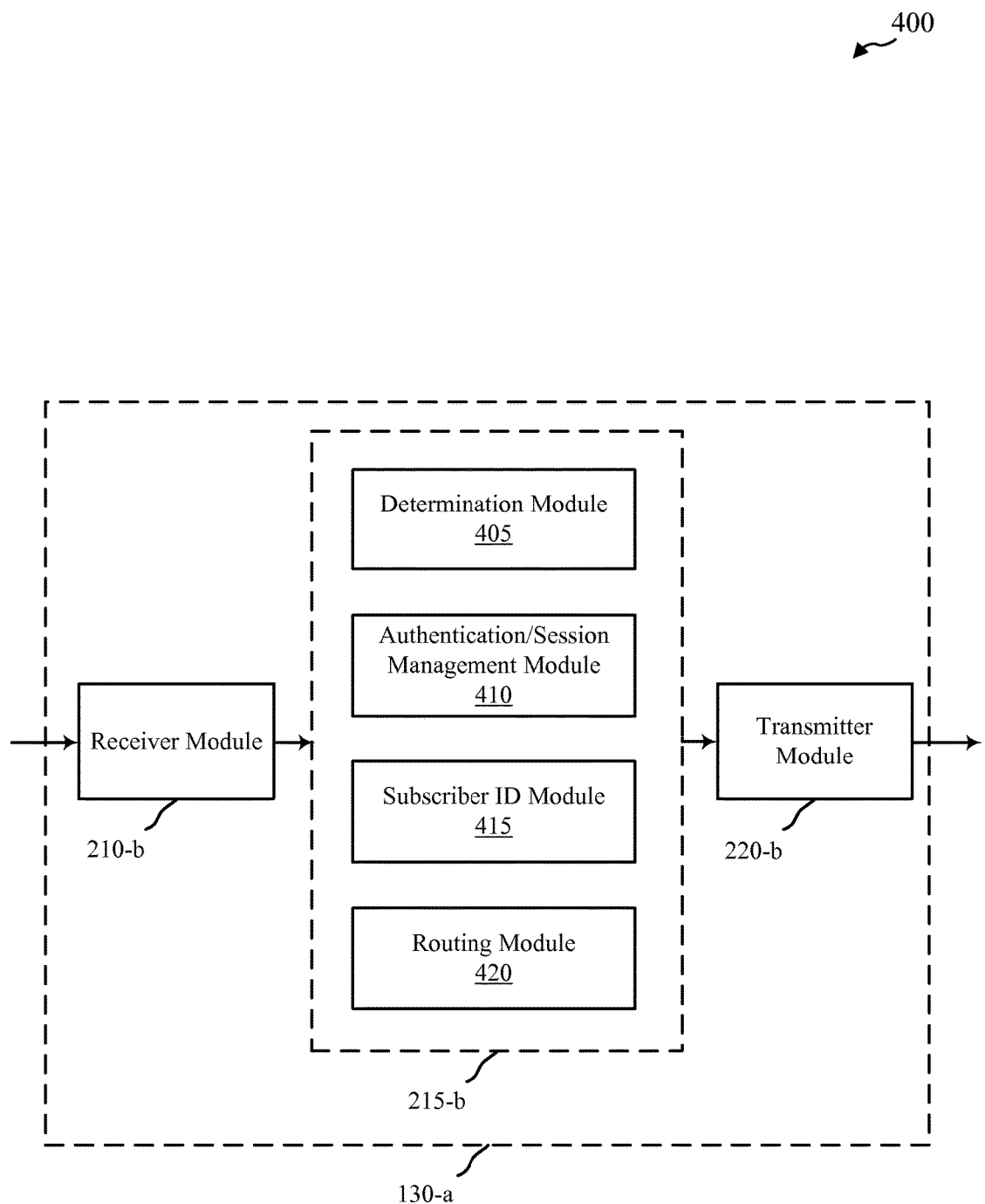
FIG. 4 shows a block diagram of a device configured for use in wireless communication, in accordance with various aspects of the present disclosure.

FIG. 4 shows a block diagram 400 of a mobile operator switching center 130-*a* that is used for wireless communication, in accordance with various examples. The mobile operator switching center 130-*a* may be an example of one or more aspects of the serving wireless network or mobile operator of the network 100 in FIG. 1 and the mobile operator switching center 130 in FIG. 1. The mobile operator switching center 130-*a* may also be an example of the device 205 described with reference to FIG. 2. The mobile operator switching center 130-*a* may include a receiver module 210-*b*, an emergency call module 215-*b*, or a transmitter module 220-*b*, which may be examples of the corresponding modules of device 205. The mobile operator switching center 130-*a* may also include a processor (not shown). Each of these modules may be in communication with each other.

In general, the various indications or information described elsewhere herein that a device placing an emergency call is capable of transmitting telematics data to a PSAP that may be transferred to or enabled for a PSAP may be applicable to being transferred to or being enabled for a mobile operator switching center 130-*a*. Thus for example, a device may send a service category information element, certain in-band signaling (e.g. DTMF tones), a device or subscriber identifier, signaling based on control plane signaling or some other indication to a mobile operator switching center 130-*a* in association with establishing an emergency call that indicates to the mobile operator switching center 130-*a* that the device supports telematics data transfer. The mobile operator switching center 130-*a* may then forward the same indication or information to a PSAP, may forward a different but equivalent indication or information to the PSAP or may not forward any indication or information to the PSAP but may instead route the emergency call to a PSAP that assumes the emergency call will have been originated by a device that supports transfer of telematics data for an emergency call.

As described above, the emergency call module 215-*b* of the mobile operator switching center 130-*a* may be configured to receive an emergency call, to receive information associated with the emergency call, and to determine, based at least in part on the received information, whether the emergency call is a personal telematics-enhanced emergency call originating from a mobile phone that is capable of transmitting telematics data to the PSAP 160 in FIG. 1.

In some examples, the emergency call module 215-*b* may be configured to receive an explicit indication that a particular emergency call is a personal telematics-enhanced emergency call (such as a personal eCall). The explicit indication may be, for example, existing eCall flags or a new eCall flag, or may be in-band signaling or based on control plane signaling.

In other examples, however, the emergency call module 215-*b* may be configured to receive information that either directly indicates that the mobile phone establishing an emergency call supports telematics-enhanced emergency calls (such as personal eCalls), or that indirectly indicates such support. In these examples, the information may be received, regardless of whether the particular emergency call at issue is or is not a telematics-enhanced emergency call. Such information may be a device or subscriber identifier, or may be an information element by which a network element of the mobile operator switching center 130 may determine whether the mobile phone supports telematics-enhanced emergency calls such as personal eCalls. Generally speaking, however, the serving wireless network or mobile operator may detect that the emergency call is from a device that supports personal eCalls and hence may be presumed to be a personal eCall, and then may or may not take this into account during routing, and may or may not transmit this information to the PSAP.

As illustrated in FIG. 4, the emergency call module 215-*b* of the mobile operator switching center 130 may include a determination module 405, an authentication/session management module 410, a subscriber ID module 415, and a routing module 420.

The determination module 405 may be configured to determine, based at least in part on information received from the receiver module 210-*b*, whether a particular emergency call is a personal telematics-enhanced emergency, whether the particular emergency call originates from a user equipment (UE) that is capable of transmitting telematics data to a PSAP, or both. The information received and considered by the determination module 405 in its determination of the type of emergency call, the capabilities of the device establishing the emergency call, or both, may include, for example, information elements (IEs) or subscriber information, as described below.

The authentication/session management module 410 may be configured to receive an information element transmitted by a UE such as a mobile phone during authentication or during a device management messaging session, and may either provide the received information to the determination module 405 for a determination as described above, or may use the received information to itself determine whether a particular emergency call is a personal telematics-enhanced emergency, whether the particular emergency call originates from a user equipment (UE) that is capable of transmitting telematics data to a PSAP, or both.

The subscriber ID module 415 may be configured to receive a subscriber identifier associated with an emergency call and may either provide the received information to the determination module 405 for a determination as described above, or may use the received information to itself determine whether a particular emergency call is a personal telematics-enhanced emergency call, whether the particular emergency call originates from a user equipment (UE) that is capable of transmitting telematics data to a PSAP, or both. As one example, the subscriber ID module 415 may compare the received subscriber identifier with a database of equipment associated with the subscriber identifier in order to determine whether any of the equipment associated with the subscriber identifier is capable of transmitting telematics data to the PSAP (e.g., is personal eCall capable). The subscriber ID module 415 may be, for example, a Home Subscriber Server (HSS) or a User Profile Server Function (UPSF) network element in some embodiments. In some embodiments, the subscriber ID module 415 may additionally or alternatively include functionality similar to the device ID module 510 described below with reference to FIG. 5. Generally speaking, the subscriber ID module 415 or the device ID module 510 may individually or together provide a mechanism for identifying a UE, a user of a UE, telematics capabilities of a UE, and so forth. When implemented in the mobile operator switching center 130-*a* of FIG. 4, the database may provide information to the PSAP responding to the emergency call that may be used to distinguish a personal eCall from other types of emergency calls or to distinguish a personal eCall capable UE from UEs that are not personal eCall capable.

The routing module 420 may be configured to route a received emergency call based at least in part on the information associated with the emergency call that is received by the receiver module 210-*b*. For example, in one embodiment, if it is determined that a particular emergency call is a personal telematics-enhanced emergency call, or if it is determined that the device that established the emergency call is capable of transmitting telematics data to a PSAP, the routing module 420 may route the emergency call to a PSAP that is capable of receiving personal telematics-enhanced emergency calls. In this embodiment, no information need be sent to the PSAP indicating that the device that established the emergency call is capable of transmitting telematics data to the PSAP. Instead, the PSAP may assume this to be true and may request telematics data from the device. This embodiment may be advantageous to a PSAP because it may avoid additional implementation to support information identifying the device as being able to transmit telematics data. As another embodiment, if it is determined that a particular emergency call is not a personal telematics-enhanced emergency call, or if it is determined that the device that established the emergency call is not capable of transmitting telematics data to a PSAP, the routing module 420 may route the emergency call to a different PSAP that may be a closest PSAP not supporting telematics data transfers or a closest PSAP regardless of the PSAP supporting certain telematics data transfers, or may use another routing procedure to route the emergency call.

The receiver module 210-*b* and the transmitter module 220-*b* may perform the functions of the receiver module 210 and the transmitter module 220, of FIG. 2, respectively. For example, the receiver module 210-*b* may receive the emergency call, may receive the indication of the type of emergency call or an indication of support for certain telematics capabilities, receive other information associated with the emergency call, and so forth. In some embodiments, the receiver module 210-*a* may be configured to receive information distinguishing a personal telematics-enhanced emergency call from other types of emergency calls (or, alternatively, information distinguishing capabilities of a mobile device from other types of wireless devices) from the originator of the emergency call. The transmitter module 220-*b* may forward (e.g., route) a received emergency call to the appropriate destination, such as a PSAP 160 or the PSTN 170.

Figure 5:
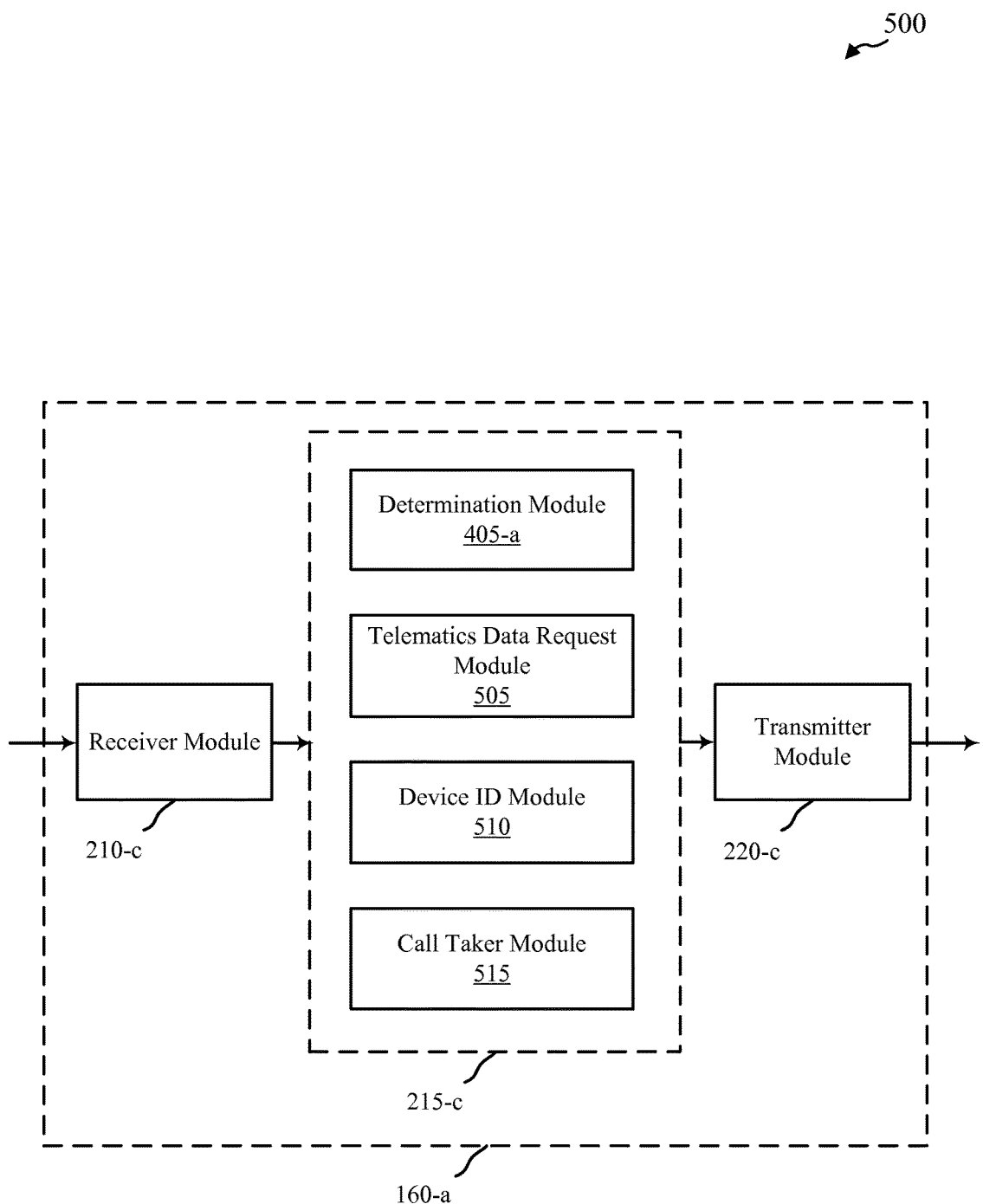
FIG. 5 shows a block diagram of a device configured for use in wireless communication, in accordance with various aspects of the present disclosure.

FIG. 5 shows a block diagram 500 of a PSAP 160-*a* that is used for wireless communication, in accordance with various examples. The PSAP 160-*a* may be an example of one or more aspects of the PSAP 160 in FIG. 1. It may also be an example of the device 205 described with reference to FIG. 2. The PSAP 160-*a* may include a receiver module 210-*c*, an emergency call module 215-*c*, or a transmitter module 220-*c*, which may be examples of the corresponding modules of device 205. The PSAP 160-*a* may also include a processor (not shown). Each of these modules may be in communication with each other.

As described above, the emergency call module 215-*c* of the PSAP 160-*a* may be configured to receive an emergency call, to receive information associated with the emergency call, and to determine, based at least in part on the received information, whether the emergency call is a personal telematics-enhanced emergency call originating from a mobile phone that is capable of transmitting telematics data to the PSAP 160-*a*.

In some examples, the emergency call module 215-*c* may be configured to receive an explicit indication that a particular emergency call is a personal telematics-enhanced emergency call (such as a personal eCall). The explicit indication may be, for example, existing eCall flags or a new eCall flag, or may be in-band signaling or signaling based on control plane signaling. The indication may be received from a wireless device that establishes the emergency call, or may be received from the serving wireless network (e.g., from the mobile operator switching center 130).

In other examples, however, the emergency call module 215-*c* may be configured to receive information that either directly indicates that the mobile phone establishing an emergency call supports telematics-enhanced emergency calls (such as personal eCalls), or that indirectly indicates such support. In these examples, the information may be received, regardless of whether the particular emergency call at issue is or is not a telematics-enhanced emergency call. Such information may be a device or subscriber identifier, or may be an information element by which an element of the PSAP 160-*a* may determine whether the mobile phone supports telematics-enhanced emergency calls such as personal eCalls.

As illustrated in FIG. 5, the emergency call module 215-*c* of the PSAP 160-*a* may include a determination module 405-*a*, a telematics data request module 505, a device ID module 510, and a call taker module 515.

The determination module 405-*a* may be an example of the determination module 405 in FIG. 4, and may be configured to determine, based at least in part on information received from the receiver module 210-*c*, whether a particular emergency call is a personal telematics-enhanced emergency, whether the particular emergency call originates from a user equipment (UE) that is capable of transmitting telematics data to the PSAP 160-*a*, or both. The data received and considered by the determination module 405-*a* may be one or more of the following: an indicator in a service category information element (IE) (which may define a binary flag indicating a personal eCall), a plurality of indicators in a service category IE (which may define a multi-bit field indicating a personal eCall, an automatic vehicle eCall, a manual vehicle eCall, a combination of the foregoing, or none of the foregoing), in-band signaling (such as DTMF tones or a different audible sound that is designed to have minimal interference with speech), signaling based on control plane signaling, a device identifier of the device establishing the emergency call, and so forth. In still other examples, the determination module 405-*a* may receive information from the serving wireless network (e.g., the mobile operator switching center 130-*a* in FIG. 4) indicating whether the emergency call is a personal telematics-enhanced emergency call, whether the emergency call is from a device that is capable of transmitting telematics data to the PSAP 160-*a*, or both. Such an indication may be associated with a wireless network subscription option for the UE indicating that the UE is capable of transmitting telematics data to the PSAP 160-*a*. In some embodiments, the PSAP, upon receiving an emergency call routed by the serving wireless network, may expect the UE to support a personal telematics-enhanced emergency call, in which case the PSAP may not need to receive an indication that the UE supports the personal telematics-enhanced emergency call because the serving wireless network has already performed the filtering and routing on behalf of the PSAP.

The telematics data request module 505 may be configured to transmit a request to the device that established or is establishing a particular emergency call to send a set of data, such as a defined minimum set of data (MSD) to the PSAP 160-*a*, and also to receive the requested set of data. The set of data may include, for example, an estimated location of the device making the emergency call, as described above.

In some embodiments, the telematics data request module 505 may only request the set of data if it is determined (with a certain probability) that the device that established or that is establishing the emergency call is capable of transmitting the set of data. This may help reduce unnecessary side-effects of requesting and waiting for a set of data if the device establishing the emergency call cannot send the data in any event.

In other embodiments, however, the telematics data request module 505 may be configured to transmit a request to send the set of data even if the information received by the PSAP 160-*a* does not identify the emergency call as a personal telematics-enhanced emergency call and also does not identify the establishing device as being capable of transmitting telematics data to the PSAP 160-*a*. For example, the telematics data request module 505 may transmit the request only in certain circumstances, such as if there is only silence or background sounds (which may indicate that the caller is incapacitated), or if there is an urgent need to obtain the location of the caller but the determination module 405-*a* was inconclusive in its determination(s).

The device ID module 510 may be configured to receive a device identifier (such as an IMEI number, a model number, etc.) of the device that establishes the emergency call and also may be configured to check the device identifier against a device identifier database of unique device identifiers that indicates whether the device associated with the identifier is capable of transmitting telematics data to the PSAP 160. The device identifier may be unique to an identity of a UE or a subscriber associated with the UE in some embodiments, and may be at least one of a mobile station international subscriber directory number (MSISDN), an international mobile subscriber identity (IMSI) or an international mobile equipment identity (IMEI). The device identifier database may be populated by serving wireless networks or mobile operators, device manufacturers, users, or some combination of the foregoing. The device identifier database may be owned or operated by a state, region, country, a PSAP, or another appropriate entity, such as an international trade association (e.g., the GSMA), or other international organization. The database may, in some embodiments, be supported by the home wireless network for the relevant UE, and may be a single national database or may be split up and supported by different home network operators for different UEs. In one alternative example, the device identifier (e.g., an IMEI) may have one or more reserved digits, reserved digit values, reserved bits, or reserved bit values that are assigned or standardized to indicate support by a device for a personal telematics-enhanced emergency call, in which case no database would be needed because the device identifier could be directly used to determine whether the device is capable of transmitting telematics data to a PSAP. In some embodiments, the device ID module 510 may additionally or alternatively include functionality similar to the subscriber ID module 415 described above with reference to FIG. 4. Generally speaking, the subscriber ID module 415 or the device ID module 510 may individually or together provide a mechanism for identifying a UE, a user of a UE, telematics capabilities of a UE, and so forth.

The call taker module 515 may be configured to provide information to a call taker to help mitigate any side effects of requesting and receiving a set of data via the telematics data request module 505. For example, the call taker module 515 may provide information to the call taker to communicate with the emergency caller regarding when and how long a mute of the voice channel may last, so that the call taker can request the set of data at an opportune time and can inform the caller that there will be a few seconds of silence. Alternatively, the call taker module 515 may provide or cause, via another module or component of the UE (e.g., the transmitter), a ticking or other tone that can be played for the emergency caller indicating that an in-band data transmission is currently taking place. Alternatively, the UE may implement such ticking or tone as part of transmitting data.

The receiver module 210-*c* and the transmitter module 220-*c* may perform the functions of the receiver module 210 and the transmitter module 220, of FIG. 2, respectively. For example, the receiver module 210-*c* may receive the emergency call (via the mobile operator switching center 130-*a* in FIG. 4), may receive information associated with the emergency call (such as an indication of the type of emergency call, an indication of capabilities of the device establishing the emergency all, or information that could be used to determine the type of emergency call or the telematics capabilities of the device) from either the wireless device establishing the emergency call or from the serving wireless network, may receive a requested set of data including an estimated location of the a particular device, may receive voice data from the user/caller, and so forth. The transmitter module 220-c may be configured to transmit a request for the device to send certain telematics data to the PSAP 160-a, and so forth.

Figure 6:
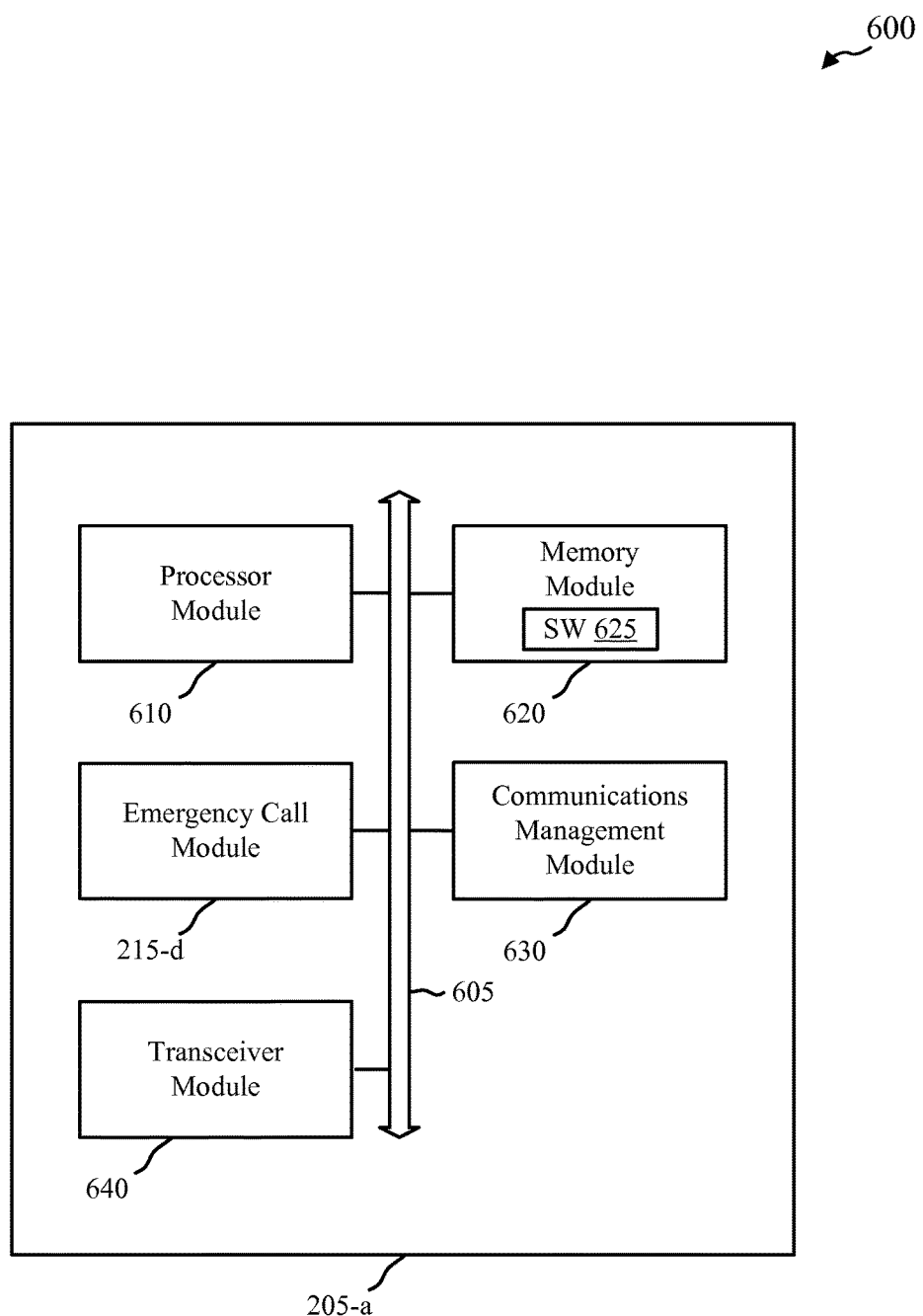
FIG. 6 shows a block diagram of an apparatus for use in wireless communication, in accordance with various aspects of the present disclosure.

Turning to FIG. 6, a diagram 600 is shown that illustrates a device 205-a configured for wireless communication. The device 205-a may have various other configurations and may be included or be part of a wireless device such as a mobile phone, a PSAP, a mobile operator switching center, and so forth. The device 205-a may be an example of the wireless devices 115, 115-a-1, 115-a-2 of FIG. 1, the device 205 of FIG. 2, the mobile phone 115-b of FIG. 3, the mobile operator switching center 130-a of FIG. 4, the PSAP 160-a of FIG. 5, and so forth.

The device 205-a may include a processor module 610, a memory module 620, a transceiver module 640 (which may be configured for wired or wireless communication, or both), and an emergency call module 215-d. The emergency call module 215-d may be an example of one of the emergency call modules 215, 215-a, 215-b, 215-c of FIGS. 2-5. Each of these modules may be in communication with each other, directly or indirectly, over at least one bus 605.

The memory module 620 may include RAM and ROM. The memory module 620 may store computer-readable, computer-executable software (SW) code 625 containing instructions that are configured to, when executed, cause the processor module 610 to perform various functions described herein. Alternatively, the software code 625 may not be directly executable by the processor module 610 but be configured to cause a computer (e.g., when compiled and executed) to perform functions described herein.

The processor module 610 may include an intelligent hardware device, e.g., a CPU, a microcontroller, an ASIC, etc. The processor module 610 may process information received through the transceiver module 640 or to be sent to the transceiver module 640 for transmission.

The transceiver module 640 may be configured to communicate bi-directionally with various entities in the network 100 in FIG. 1, including wireless devices 115, the mobile operator switching center 130, the PSAP 160, and so forth. The transceiver module 640 may be implemented as at least one transmitter module and at least one separate receiver module. The transceiver module 640 may include a modem configured to modulate the packets and provide the modulated packets to antennas or wired connections for transmission, and to demodulate packets received from the antennas or wired connections.

According to the architecture of FIG. 6, the device 205-a may further include a communications management module 630. The communications management module 630 may manage communications with various entities in the system 100 in FIG. 1. The communications management module 630 may be a component of the device 205-a in communication with some or all of the other components of the device 205-a over the at least one bus 605. Alternatively, functionality of the communications management module 630 may be implemented as a component of the transceiver module 640, as a computer program product, or as at least one controller element of the processor module 610.

The components of the device 205-a may be configured to implement aspects discussed above with respect to FIGS. 1-5, and those aspects may not be repeated here for the sake of brevity. Moreover, the components of the device 205-a may be configured to implement aspects discussed below with respect to FIGS. 7-11, and those aspects may not be repeated here also for the sake of brevity.

Figure 7:
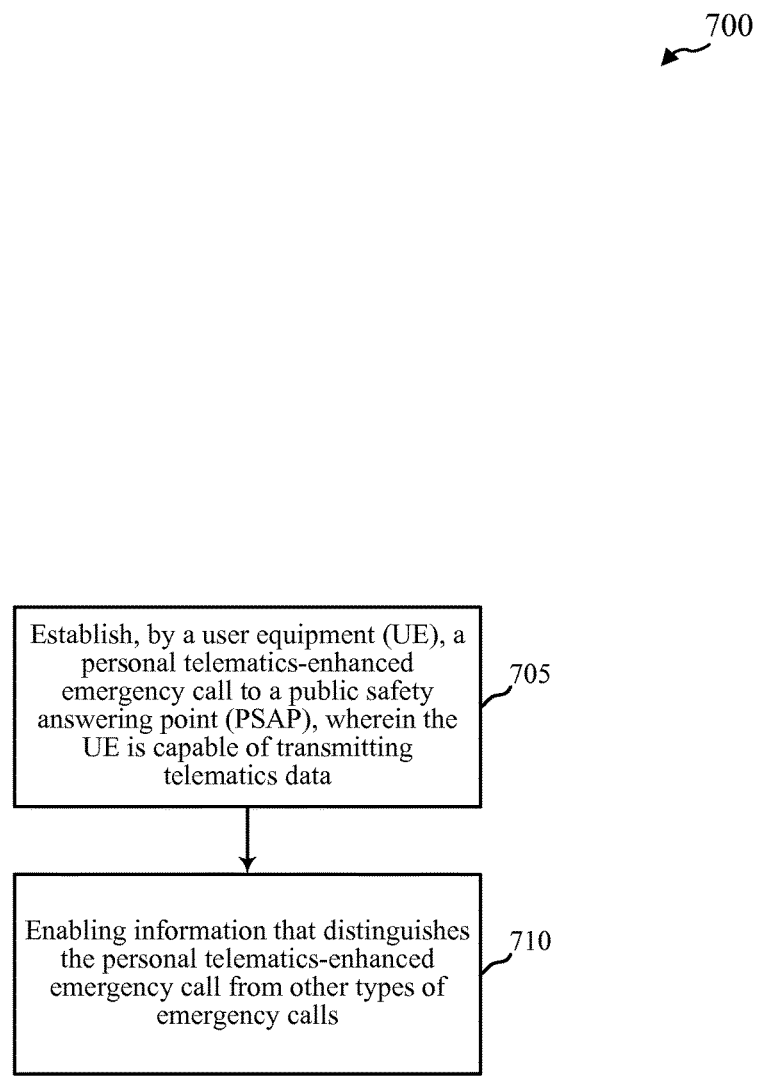
FIG. 7 is a flow chart illustrating an example of a method for wireless communication, in accordance with various aspects of the present disclosure.

FIG. 7 is a flow chart illustrating an example of a method 700 for wireless communication, in accordance with various aspects of the present disclosure. For clarity, the method 700 is described below with reference to aspects of one or more of the wireless devices 115 and mobile phones 115-a-1, 115-b described above with reference to FIGS. 1-2. In some examples, a wireless device 115 such as a mobile phone 115-a-1, 115-b may execute one or more sets of codes to control its functional elements to perform the functions described below. Additionally or alternatively, the wireless device 115 such as a mobile phone 115-a-1, 115-b may perform one or more of the functions described below using special-purpose hardware.

At block 705, the method 700 may include establishing, by a UE, a personal telematics-enhanced emergency call to a PSAP, wherein the UE is capable of transmitting telematics data to the PSAP. The UE may be a wireless device 115 such as a mobile phone 115-a-1, 115-b, as described above. At block 710, the method 700 may include enabling (e.g., transmitting) information that distinguishes the personal telematics-enhanced emergency call from other types of emergency calls. The information transmitted at block 710 may in some instances be an explicit indication that a particular emergency call is a personal eCall, while in other cases the information transmitted at block 710 may be an indication that the UE supports personal eCall and hence may be able to transmit telematics data to a PSAP regardless of whether the underlying emergency call is a personal eCall or not.

Thus, the method 700 may provide for wireless communication. It should be noted that the method 700 is just one implementation and that the operations of the method 700 may be rearranged or otherwise modified such that other implementations are possible.

Figure 8:
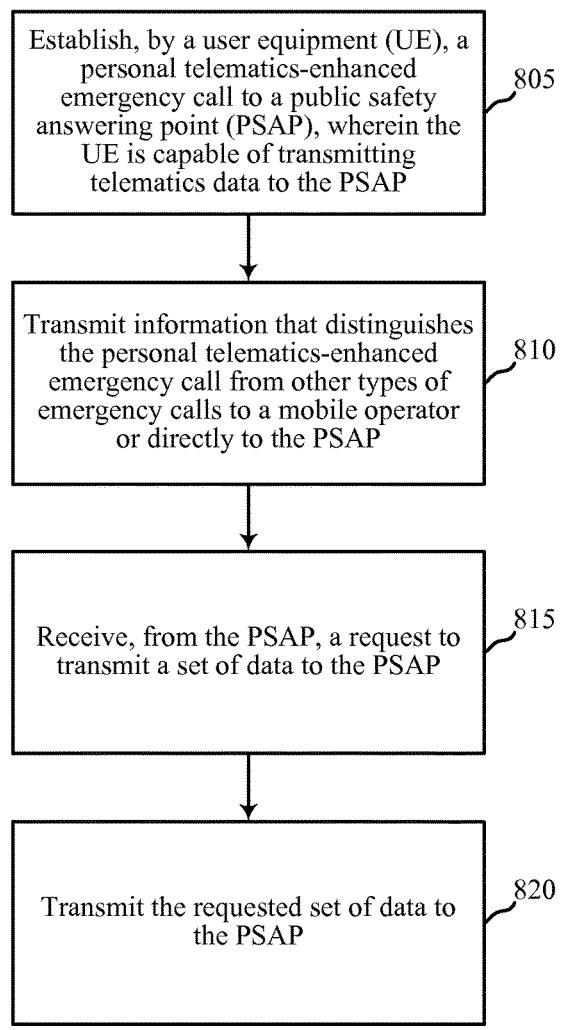
FIG. 8 is a flow chart illustrating an example of a method for wireless communication, in accordance with various aspects of the present disclosure.

FIG. 8 is a flow chart illustrating an example of a method 800 for wireless communication, in accordance with various aspects of the present disclosure. For clarity, the method 800 is described below with reference to aspects of one or more of the wireless devices 115 and mobile phones 115-a-1, 115-b described above with reference to FIGS. 1-2. In some examples, a wireless device 115 such as a mobile phone 115-a-1, 115-b may execute one or more sets of codes to control its functional elements to perform the functions described below. Additionally or alternatively, the wireless device 115 such as a mobile phone 115-a-1, 115-b may perform one or more of the functions described below using special-purpose hardware.

At block 805, the method 800 may include establishing, by a UE, a personal telematics-enhanced emergency call to a PSAP, wherein the UE is capable of transmitting telematics data to the PSAP. At block 810, the method 800 may include transmitting information that distinguishes the personal telematics-enhanced emergency call from other types of emergency calls to a serving wireless network or directly to the PSAP. At block 815, the method 800 may include receiving, from the PSAP, a request to transmit a set of data to the PSAP. And finally, at block 820, the method 800 may include transmitting the requested set of data to the PSAP.

Thus, the method 800 may provide for wireless communication. It should be noted that the method 800 is just one implementation and that the operations of the method 800 may be rearranged or otherwise modified such that other implementations are possible.

Figure 9:
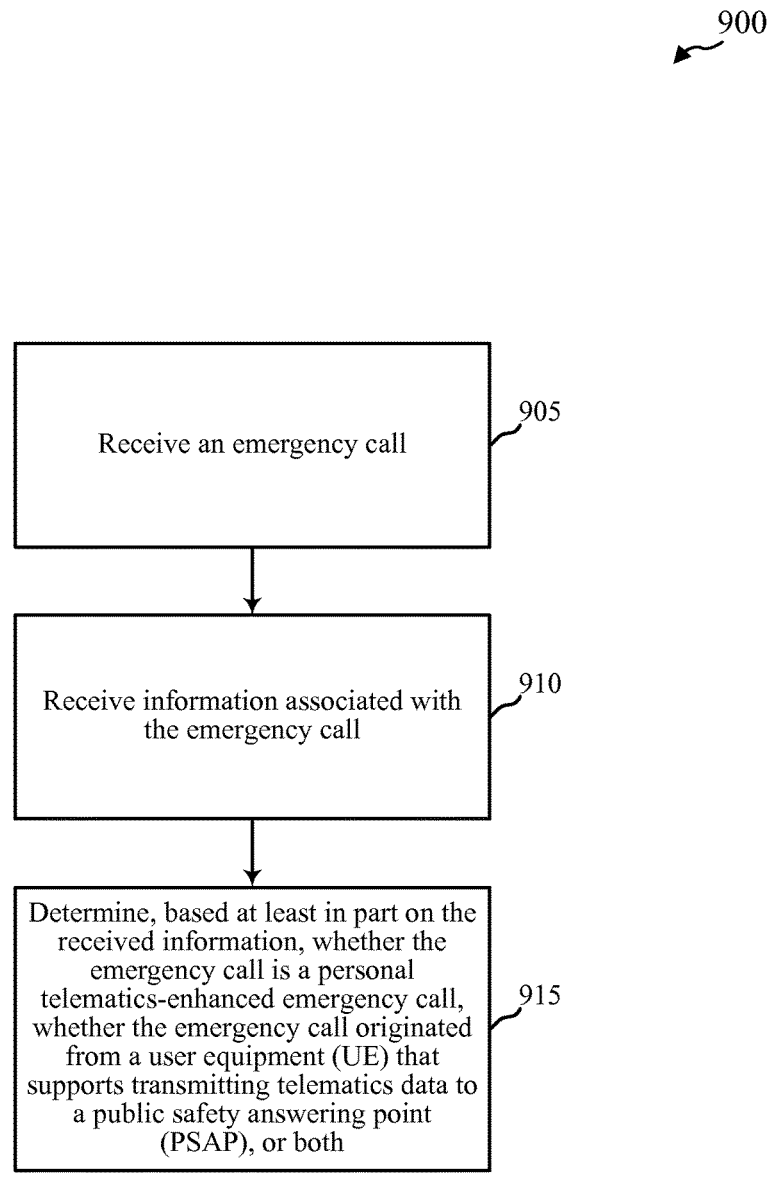
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the serving wireless network (e.g., the mobile operator switching centers 130 described above with reference to FIGS. 1 and 4), or aspects of one or more of the PSAPs 160, 160-a described above with reference to FIGS. 1 and 5. In some examples, a serving wireless network or a PSAP may execute one or more sets of codes to control its functional elements to perform the functions described below. Additionally or alternatively, the serving wireless network or the PSAP may perform one or more of the functions described below using special-purpose hardware.

At block 905, the method 900 may include receiving an emergency call. At block 910, the method 900 may include receiving information associated with the emergency call. At block 915, the method 900 may include determining, based at least in part on the received information, whether the emergency call is a personal telematics-enhanced emergency call, whether the emergency call originated from a UE that supports transmitting telematics data to the PSAP, or both Thus, the method 900 may provide for wireless communication. It should be noted that the method 900 is just one implementation and that the operations of the method 900 may be rearranged or otherwise modified such that other implementations are possible.

Figure 10:
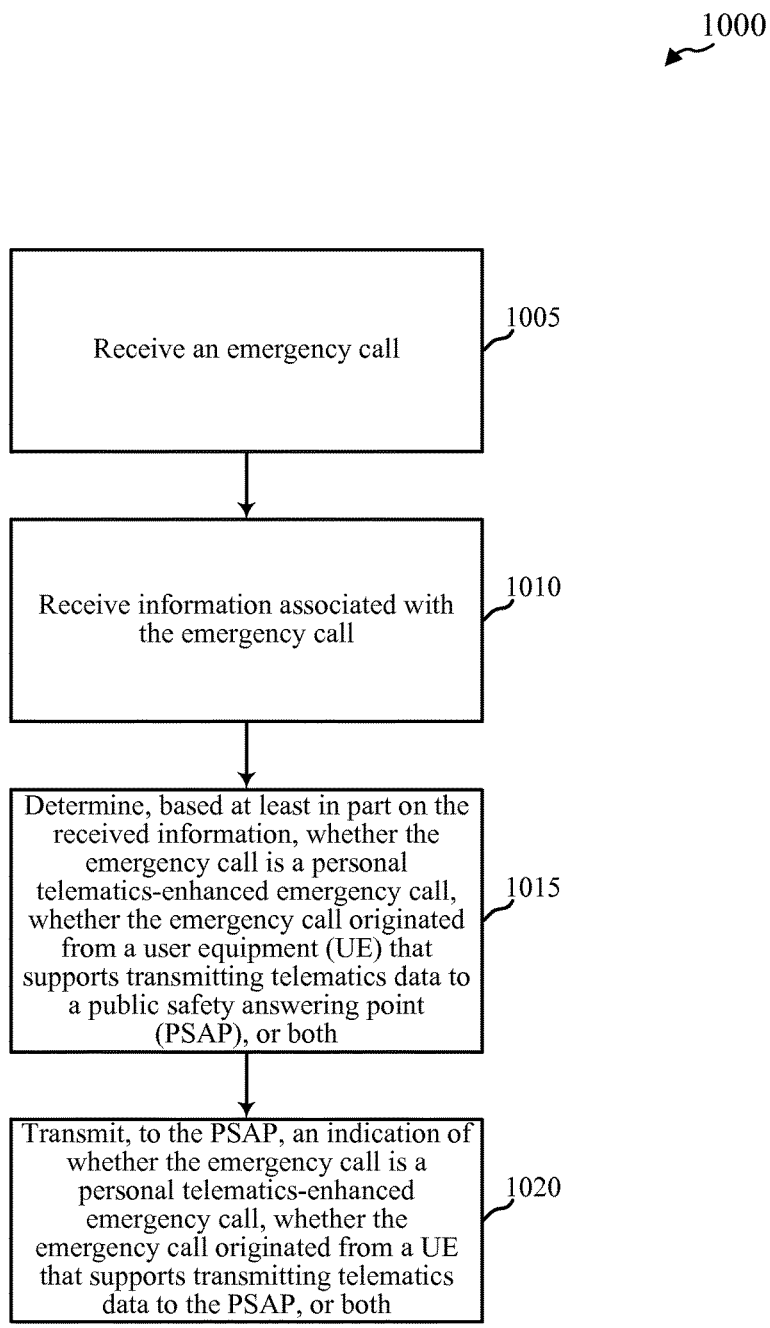
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the serving wireless network (e.g., the mobile operator switching centers 130 described above with reference to FIGS. 1 and 3), which may also be referred to herein as the serving wireless network for the UE. In some examples, a serving wireless network may execute one or more sets of codes to control its functional elements to perform the functions described below. Additionally or alternatively, the serving wireless network may perform one or more of the functions described below using special-purpose hardware.

At block 1005, the method 1000 may include receiving an emergency call. At block 1010, the method 1000 may include receiving information associated with the emergency call. At block 1015, the method 1000 may include determining, based at least in part on the received information, whether the emergency call is a personal telematics-enhanced emergency call, whether the emergency call originated from a UE that supports transmitting telematics data to a PSAP, or both. At block 1020, the method 1000 may include transmitting, to the PSAP, an indication of whether the emergency call is a personal telematics-enhanced emergency call, whether the emergency call originated from a UE that supports transmitting telematics data to the PSAP, or both.

Thus, the method 1000 may provide for wireless communication. It should be noted that the method 1000 is just one implementation and that the operations of the method 1000 may be rearranged or otherwise modified such that other implementations are possible.

Figure 11:
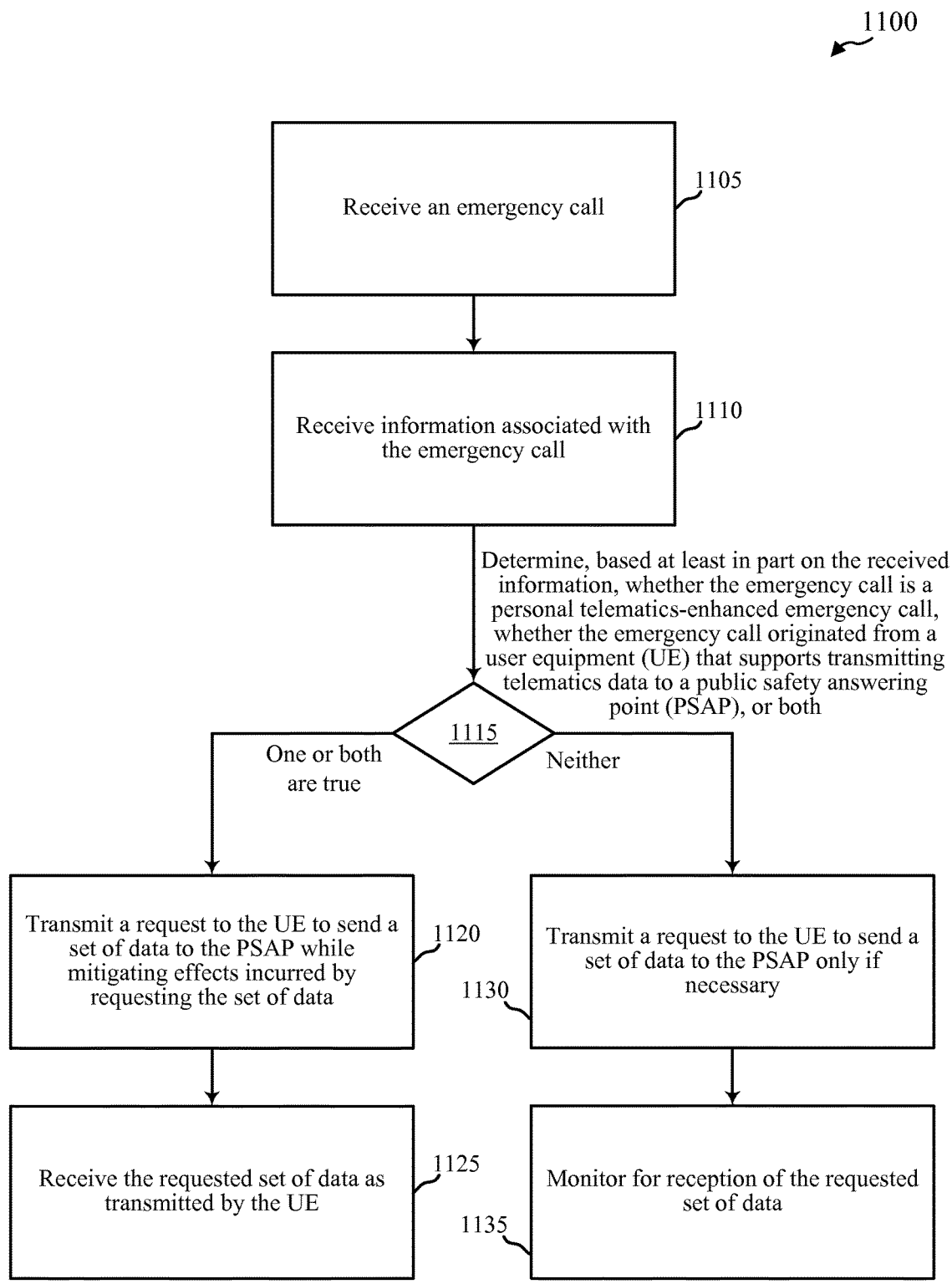
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the PSAPs 160, 160-a described above with reference to FIGS. 1 and 5. In some examples, a PSAP may execute one or more sets of codes to control its functional elements to perform the functions described below. Additionally or alternatively, the PSAP may perform one or more of the functions described below using special-purpose hardware.

At block 1105, the method 1100 may include receiving an emergency call. At block 1110, the method 1100 may include receiving information associated with the emergency call. At block 1115, the method 1100 may include determining, based at least in part on the received information, whether the emergency call is a personal telematics-enhanced emergency call, whether the emergency call originated from a UE that supports transmitting telematics data to a PSAP, or both. If one or both are true (i.e., if the emergency call is identified as being a personal telematics-enhanced emergency call OR if the emergency call originated from a UE that supports transmitting telematics data to a PSAP OR both), then method 1100 proceeds to block 1120, where the PSAP transmits a request to the UE to send a set of data to the PSAP while mitigating the effects incurred by requesting the set of data. Then, at block 1125, the PSAP receives the requested set of data transmitted by the UE. Returning to block 1115, if neither are true, then method 1100 proceeds to block 1130, where the PSAP transmits a request to the UE to send a set of data to the PSAP only if necessary (e.g., only in certain circumstances where the possible benefits of requesting the data outweigh the likely side effects of requesting the data). For example, the PSAP may request the set of data only during silent calls or as a last resort, such as if the caller cannot supply a location. Then, at block 1135, the PSAP monitors for reception of the requested set of data from the UE.

Thus, the method 1100 may provide for wireless communication. It should be noted that the method 1100 is just one implementation and that the operations of the method 1100 may be rearranged or otherwise modified such that other implementations are possible.

In some examples, aspects from two or more of the methods 700, 800, 900, 1000, 1100 may be combined. It should be noted that the methods 700, 800, 900, 1000, 1100 are just example implementations, and that the operations of the methods 700, 800, 900, 1000, 1100 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
    establishing, by a user equipment (UE), a personal telematics-enhanced emergency call to a public safety answering point (PSAP), wherein the UE is capable of transmitting telematics data;
    enabling information that distinguishes the personal telematics-enhanced emergency call from other types of emergency calls; and
    transmitting the information that distinguishes the personal telematics-enhanced emergency call from other types of emergency calls via in-band signaling.

2. The method of claim 1, wherein transmitting the information that distinguishes the personal telematics-enhanced emergency call from other types of emergency calls is to at least one of a serving network, a home network, or the PSAP.

3. The method of claim 1, wherein the information that distinguishes the personal telematics-enhanced emergency call from other types of emergency calls comprises an indicator in a service category information element.

4. The method of claim 1, wherein the information that distinguishes the personal telematics-enhanced emergency call from other types of emergency calls comprises a plurality of indicators in a service category information element, the plurality of indicators comprising a multi-bit field indicating a personal eCall, an automatic vehicle eCall, a manual vehicle eCall, any combination of the foregoing, or a telematics capability of the UE.

5. The method of claim 1, wherein the in-band signaling comprises one or more dual-tone multi-frequency (DTMF) tones transmitted prior to transmitting telematics data.

6. The method of claim 1, further comprising:
    receiving, from the PSAP, a request to transmit a set of data to the PSAP based at least in part on the information that distinguishes the personal telematics-enhanced emergency call from other types of emergency calls; and
    transmitting the set of data to the PSAP.

7. A method for wireless communication, comprising:
    establishing, by a user equipment (UE), a personal telematics-enhanced emergency call to a public safety answering point (PSAP), wherein the UE is capable of transmitting telematics data;
    determining an identifier for the UE to serve as information that distinguishes the personal telematics-enhanced emergency call from other types of emergency calls.

8. The method of claim 7, wherein the identifier for the UE is present in a database accessible to the PSAP or a serving wireless network for the UE.

9. The method of claim 7, wherein the identifier for the UE comprises at least one of a device model number, a mobile station international subscriber directory number (MSISDN), an international mobile subscriber identity (IMSI), or an international mobile equipment identity (IMEI).

10. The method of claim 7, further comprising:
transmitting the identifier for the UE prior to transmission of telematics data.

11. The method of claim 7, further comprising:
receiving, from the PSAP, a request to transmit a set of data to the PSAP based at least in part on the identifier for the UE; and
transmitting the set of data to the PSAP.

12. A method for wireless communication, comprising:
establishing, by a user equipment (UE), a personal telematics-enhanced emergency call to a public safety answering point (PSAP), wherein the UE is capable of transmitting telematics data;
determining a wireless network subscription option to serve as information that distinguishes the personal telematics-enhanced emergency call from other types of emergency calls; and
transmitting information that identifies the wireless network subscription option.

13. The method of claim 12, further comprising:
receiving, from the PSAP, a request to transmit a set of data to the PSAP based at least in part on the wireless network subscription option; and
transmitting the set of data to the PSAP.

14. A method for wireless communication, comprising:
establishing, by a user equipment (UE), a personal telematics-enhanced emergency call to a public safety answering point (PSAP), wherein the UE is capable of transmitting telematics data;
enabling information that distinguishes the personal telematics-enhanced emergency call from other types of emergency calls; and
transmitting the information that distinguishes the personal telematics-enhanced emergency call from other types of emergency calls to a serving wireless network for the UE as an information element during authentication with the serving wireless network.

15. The method of claim 14, further comprising:
receiving, from the PSAP, a request to transmit a set of data to the PSAP based at least in part on the information that distinguishes the personal telematics-enhanced emergency call from other types of emergency calls; and
transmitting the set of data to the PSAP.

16. An apparatus for wireless communication, comprising:
means for establishing, by a user equipment (UE), a personal telematics-enhanced emergency call to a public safety answering point (PSAP), wherein the UE is capable of transmitting telematics data;
means for enabling information that distinguishes the personal telematics-enhanced emergency call from other types of emergency calls; and
means for transmitting the information that distinguishes the personal telematics-enhanced emergency call from other types of emergency calls, the means for transmitting the information that distinguishes the personal telematics-enhanced emergency call from other types of emergency calls transmits the information via in-band signaling.

17. The apparatus of claim 16, wherein the information that distinguishes the personal telematics-enhanced emergency call from other types of emergency calls comprises a plurality of indicators in a service category information element, the plurality of indicators comprising a multi-bit field indicating a personal eCall, an automatic vehicle eCall, a manual vehicle eCall, any combination of the foregoing, or a telematics capability of the UE.

18. The apparatus of claim 16, wherein the in-band signaling comprises one or more dual-tone multi-frequency (DTMF) tones transmitted prior to transmitting telematics data.

19. The apparatus of claim 16, further comprising:
means for receiving, from the PSAP, a request to transmit a set of data to the PSAP based at least in part on the information that distinguishes the personal telematics-enhanced emergency call from other types of emergency calls; and
means for transmitting the set of data to the PSAP.

20. An apparatus for wireless communication, comprising:
means for establishing, by a user equipment (UE), a personal telematics-enhanced emergency call to a public safety answering point (PSAP), wherein the UE is capable of transmitting telematics data; and
means for enabling an identifier for the UE to serve as information that distinguishes the personal telematics-enhanced emergency call from other types of emergency calls.

21. The apparatus of claim 20, wherein the identifier for the UE comprises at least one of a device model number, a mobile station international subscriber directory number (MSISDN), an international mobile subscriber identity (IMSI), or an international mobile equipment identity (IMEI).

22. The apparatus of claim 20, further comprising:
means for transmitting the identifier for the UE prior to transmission of telematics data.

23. The apparatus of claim 20, further comprising:
means for receiving, from the PSAP, a request to transmit a set of data to the PSAP based at least in part on the identifier for the UE; and
means for transmitting the set of data to the PSAP.

24. An apparatus for wireless communication, comprising:
means for establishing, by a user equipment (UE), a personal telematics-enhanced emergency call to a public safety answering point (PSAP), wherein the UE is capable of transmitting telematics data;
means for enabling a wireless network subscription option to serve as information that distinguishes the personal telematics-enhanced emergency call from other types of emergency calls; and
means for transmitting information that identifies the wireless network subscription option.

25. The apparatus of claim 24, further comprising:
means for receiving, from the PSAP, a request to transmit a set of data to the PSAP based at least in part on the wireless network subscription option; and
transmitting the set of data to the PSAP.

26. An apparatus for wireless communication, comprising:
means for establishing, by a user equipment (UE), a personal telematics-enhanced emergency call to a public safety answering point (PSAP), wherein the UE is capable of transmitting telematics data;
means for enabling information that distinguishes the personal telematics-enhanced emergency call from other types of emergency calls; and
means for transmitting the information that distinguishes the personal telematics-enhanced emergency call from other types of emergency calls, the means for transmitting the information that distinguishes the personal telematics-enhanced emergency call from other types of emergency calls transmits the information to a serving wireless network for the UE as an information element during authentication with the serving wireless network.

27. The apparatus of claim 26, further comprising:

means for receiving, from the PSAP, a request to transmit a set of data to the PSAP based at least in part on the information that distinguishes the personal telematics-enhanced emergency call from other types of emergency calls; and means for transmitting the set of data to the PSAP.

* * * * *